United States Patent
Judi et al.

(10) Patent No.: US 12,300,275 B2
(45) Date of Patent: May 13, 2025

(54) EDITING VIDEO CAPTURED BY ELECTRONIC DEVICES

(71) Applicant: Snap Inc., Santa Monica, CA (US)

(72) Inventors: Terek Judi, Long Beach, CA (US); Dmytro Kucher, Marina Del Rey, CA (US); Shaofeng Mo, Marina Del Rey, CA (US); Imani Ritchards, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 158 days.

(21) Appl. No.: 18/059,879

(22) Filed: Nov. 29, 2022

(65) Prior Publication Data

US 2023/0352054 A1  Nov. 2, 2023

Related U.S. Application Data

(60) Provisional application No. 63/335,424, filed on Apr. 27, 2022.

(51) Int. Cl.
*G11B 27/034* (2006.01)
*G06T 19/00* (2011.01)

(52) U.S. Cl.
CPC .......... *G11B 27/034* (2013.01); *G06T 19/006* (2013.01)

(58) Field of Classification Search
CPC ..... G11B 27/34; G11B 27/034; G11B 27/031; G11B 27/00; G11B 27/002; G11B 27/10; G11B 27/11; G06T 19/006; H04N 5/144; H04N 21/44008; H04N 21/47217
USPC ....................................................... 386/241
See application file for complete search history.

(56) References Cited

U.S. PATENT DOCUMENTS

| 6,038,295 A | 3/2000 | Mattes |
| 6,819,982 B2 | 11/2004 | Doane |
| 6,980,909 B2 | 12/2005 | Root et al. |
| 7,173,651 B1 | 2/2007 | Knowles |

(Continued)

FOREIGN PATENT DOCUMENTS

| CA | 2887596 A1 | 7/2015 |
| WO | 2019127376 | 7/2019 |

(Continued)

OTHER PUBLICATIONS

US 10,656,660 B1, 05/2020, Meisenholder et al. (withdrawn)

(Continued)

*Primary Examiner* — Thai Q Tran
*Assistant Examiner* — Nienru Yang
(74) *Attorney, Agent, or Firm* — Schwegman Lundberg & Woessner, P.A.

(57) ABSTRACT

Example systems, computer readable medium and methods include receiving a video taken from a drone where the drone followed a flight path based on a flight plan. A user interface is presented that provides options for the user to select video editing effects to be performed on the video where the options are based on the flight plan or flight path that was used to take the video. Additionally, after the video effects are applied to the video, a user interface is presented to the user to further edit the video where the user interface is customized in accordance with the video effects used to modify the video. Moreover, the user is presented with options for adding AR effects to the video where 2D body tracking and segmentation are used adding the AR effects.

20 Claims, 32 Drawing Sheets

(56) References Cited

U.S. PATENT DOCUMENTS

| | | |
|---|---|---|
| 7,411,493 B2 | 8/2008 | Smith |
| 7,535,890 B2 | 5/2009 | Rojas |
| 7,542,073 B2 | 6/2009 | Li et al. |
| 7,971,156 B2 | 6/2011 | Albertson et al. |
| 8,131,597 B2 | 3/2012 | Hudetz |
| 8,174,562 B2 | 5/2012 | Hartman |
| 8,199,747 B2 | 6/2012 | Rojas et al. |
| 8,274,550 B2 | 9/2012 | Steuart, III |
| 8,332,475 B2 | 12/2012 | Rosen et al. |
| 8,646,720 B2 | 2/2014 | Shaw |
| 8,718,333 B2 | 5/2014 | Wolf et al. |
| 8,724,622 B2 | 5/2014 | Rojas |
| 8,874,677 B2 | 10/2014 | Rosen et al. |
| 8,909,679 B2 | 12/2014 | Root et al. |
| 8,995,433 B2 | 3/2015 | Rojas |
| 9,040,574 B2 | 5/2015 | Wang et al. |
| 9,055,416 B2 | 6/2015 | Rosen et al. |
| 9,100,806 B2 | 8/2015 | Rosen et al. |
| 9,100,807 B2 | 8/2015 | Rosen et al. |
| 9,191,776 B2 | 11/2015 | Root et al. |
| 9,204,252 B2 | 12/2015 | Root |
| 9,225,897 B1 | 12/2015 | Sehn et al. |
| 9,276,886 B1 | 3/2016 | Samaranayake |
| 9,344,642 B2 | 5/2016 | Niemi et al. |
| 9,345,711 B2 | 5/2016 | Friedhoff |
| 9,443,227 B2 | 9/2016 | Evans et al. |
| 9,471,059 B1 | 10/2016 | Wilkins |
| 9,489,661 B2 | 11/2016 | Evans et al. |
| 9,489,937 B1 | 11/2016 | Beard et al. |
| 9,491,134 B2 | 11/2016 | Rosen et al. |
| 9,576,369 B2 | 2/2017 | Venkataraman et al. |
| 9,589,448 B1 | 3/2017 | Schneider et al. |
| 9,681,046 B2 | 6/2017 | Adsumilli et al. |
| 9,705,831 B2 | 7/2017 | Spiegel |
| 9,723,272 B2 | 8/2017 | Lu et al. |
| 9,742,713 B2 | 8/2017 | Spiegel et al. |
| 9,747,901 B1 | 8/2017 | Gentry |
| 9,922,659 B2 | 3/2018 | Bradlow et al. |
| 9,989,965 B2 | 6/2018 | Cuban et al. |
| 10,061,328 B2 | 8/2018 | Canoy et al. |
| 10,102,423 B2 | 10/2018 | Shaburov et al. |
| 10,109,224 B1 | 10/2018 | Ratti et al. |
| 10,140,987 B2 | 11/2018 | Erickson et al. |
| 10,168,700 B2 | 1/2019 | Gordon et al. |
| 10,284,508 B1 | 5/2019 | Allen et al. |
| 10,370,118 B1 | 8/2019 | Nielsen et al. |
| 10,439,972 B1 | 10/2019 | Spiegel et al. |
| 10,501,180 B2 | 12/2019 | Yu |
| 10,509,466 B1 | 12/2019 | Miller et al. |
| 10,514,876 B2 | 12/2019 | Sehn |
| 10,614,855 B2 | 4/2020 | Huang |
| 10,748,347 B1 | 8/2020 | Li et al. |
| 10,768,639 B1 | 9/2020 | Meisenholder et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 2007/0250526 A1 | 10/2007 | Hanna |
| 2008/0255842 A1 | 10/2008 | Simhi |
| 2009/0122133 A1 | 5/2009 | Hartman |
| 2011/0202598 A1 | 8/2011 | Evans et al. |
| 2012/0194420 A1 | 8/2012 | Osterhout et al. |
| 2012/0209924 A1 | 8/2012 | Evans et al. |
| 2012/0281885 A1 | 11/2012 | Syrdal et al. |
| 2012/0287274 A1 | 11/2012 | Bevirt |
| 2013/0056581 A1 | 3/2013 | Sparks |
| 2013/0238168 A1 | 9/2013 | Reyes |
| 2014/0254896 A1 | 9/2014 | Zhou et al. |
| 2015/0022432 A1 | 1/2015 | Stewart et al. |
| 2015/0070272 A1 | 3/2015 | Kim et al. |
| 2015/0175263 A1 | 6/2015 | Reyes |
| 2015/0199022 A1 | 7/2015 | Gottesman et al. |
| 2015/0287246 A1 | 10/2015 | Huston et al. |
| 2015/0331490 A1 | 11/2015 | Yamada |
| 2015/0362917 A1 | 12/2015 | Wang et al. |
| 2016/0063987 A1 | 3/2016 | Xu et al. |
| 2016/0161946 A1 | 6/2016 | Wuth Sepulveda et al. |
| 2016/0179096 A1 | 6/2016 | Bradlow et al. |
| 2016/0292886 A1 | 10/2016 | Erad et al. |
| 2016/0307573 A1 | 10/2016 | Wobrock |
| 2016/0336020 A1 | 11/2016 | Bradlow et al. |
| 2017/0031369 A1 | 2/2017 | Liu et al. |
| 2017/0076612 A1 | 3/2017 | Takahashi et al. |
| 2017/0094259 A1 | 3/2017 | Kouperman et al. |
| 2017/0099424 A1 | 4/2017 | Jones |
| 2017/0102699 A1 | 4/2017 | Anderson |
| 2017/0177925 A1 | 6/2017 | Volkart |
| 2017/0225796 A1 | 8/2017 | Sun et al. |
| 2017/0228690 A1 | 8/2017 | Kohli |
| 2017/0244937 A1 | 8/2017 | Meier et al. |
| 2017/0320564 A1 | 11/2017 | Kuzikov |
| 2017/0337791 A1 | 11/2017 | Gordon-Carroll |
| 2017/0371353 A1 | 12/2017 | Millinger, III |
| 2018/0082682 A1 | 3/2018 | Erickson et al. |
| 2018/0246529 A1 | 8/2018 | Hu et al. |
| 2019/0011921 A1 | 1/2019 | Wang et al. |
| 2019/0189160 A1* | 6/2019 | Huang .................. H04N 23/60 |
| 2019/0250601 A1 | 8/2019 | Donahoe et al. |
| 2020/0241575 A1 | 7/2020 | Meisenholder et al. |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0173396 A1 | 6/2021 | Zhang et al. |
| 2021/0241529 A1 | 8/2021 | Cowburn et al. |
| 2021/0272599 A1* | 9/2021 | Patterson ................. G06N 3/08 |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0362848 A1 | 11/2021 | Spencer |
| 2021/0382503 A1* | 12/2021 | Meisenholder ......... G10L 17/00 |
| 2021/0382564 A1 | 12/2021 | Blachly et al. |
| 2021/0383124 A1* | 12/2021 | Imes ..................... G06V 10/82 |
| 2021/0397000 A1 | 12/2021 | Rodriguez, II |

FOREIGN PATENT DOCUMENTS

| | | |
|---|---|---|
| WO | 2022141369 | 7/2022 |
| WO | 2023211616 | 11/2023 |

OTHER PUBLICATIONS

Laput, Gierad, et al., "PixelTone: A Multimodal Interface for Image Editing", ACM, Proceedings of the SIGCHI Conference on Human Factors in Computing Systems, Paris, FR, (2013), 10 pgs.

Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.

Meisenholder, David, et al., "Remoteless Control of Drone Behavior", U.S. Appl. No. 15/640,143, filed Jun. 30, 2017, 108 pgs.

Pourmehr, Shokoofeh, et al., "'You two! Take off!': Creating, Modifying, and Commanding Groups of Robots Using Face Engagement and Indirect Speech in Voice Commands", IEEE/RSJ International Conference on Intelligent Robots and Systems (IROS), Tokyo, JP, (2013), 137-142.

Yamada, Wataru, et al., "iSphere: Self-Luminous Spherical Drone Display", Proceedings of the 30th Annual ACM Symposium on User Interface Software and Technology (UIST), Quebec City, CA, (Oct. 22-25, 2017), 635-343.

"International Application Serial No. PCT/US2023/016752, International Search Report mailed Jun. 5, 2023", 4 pgs.

(56) References Cited

OTHER PUBLICATIONS

"International Application Serial No. PCT/US2023/016752, Written Opinion mailed Jun. 5, 2023", 6 pgs.

\* cited by examiner

EDITING VIDEO CAPTURED BY ELECTRONIC DEVICES

PRIORITY CLAIM

This application claims the benefit of priority under 35 U.S.C. 119(e) to U.S. Provisional Patent Application Ser. No. 63/335,424, filed Apr. 27, 2022, which is incorporated herein by reference in its entirety.

TECHNICAL FIELD

Examples of the present disclosure relate generally to editing video captured by electronic devices. More particularly, but not by way of limitation, the present disclosure addresses systems and methods for editing video captured by electronic devices such as a drone where the video effects that are applied depend on a path the electronic device navigated in taking the video and where augmented reality (AR) effects are added to the video based on two-dimensional body tracking and segmentation masks.

BACKGROUND

Editing video is often a processing intensive task. Users often want to edit and modify video to enhance their presentation. But editing programs are often limited in the processing power they have available or are limited in the amount of time they have to process the video. Moreover, users of video editing programs often have difficulty in creating new effects.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some non-limiting examples are illustrated in the figures of the accompanying drawings in which.

DETAILED DESCRIPTION

Figure 1:
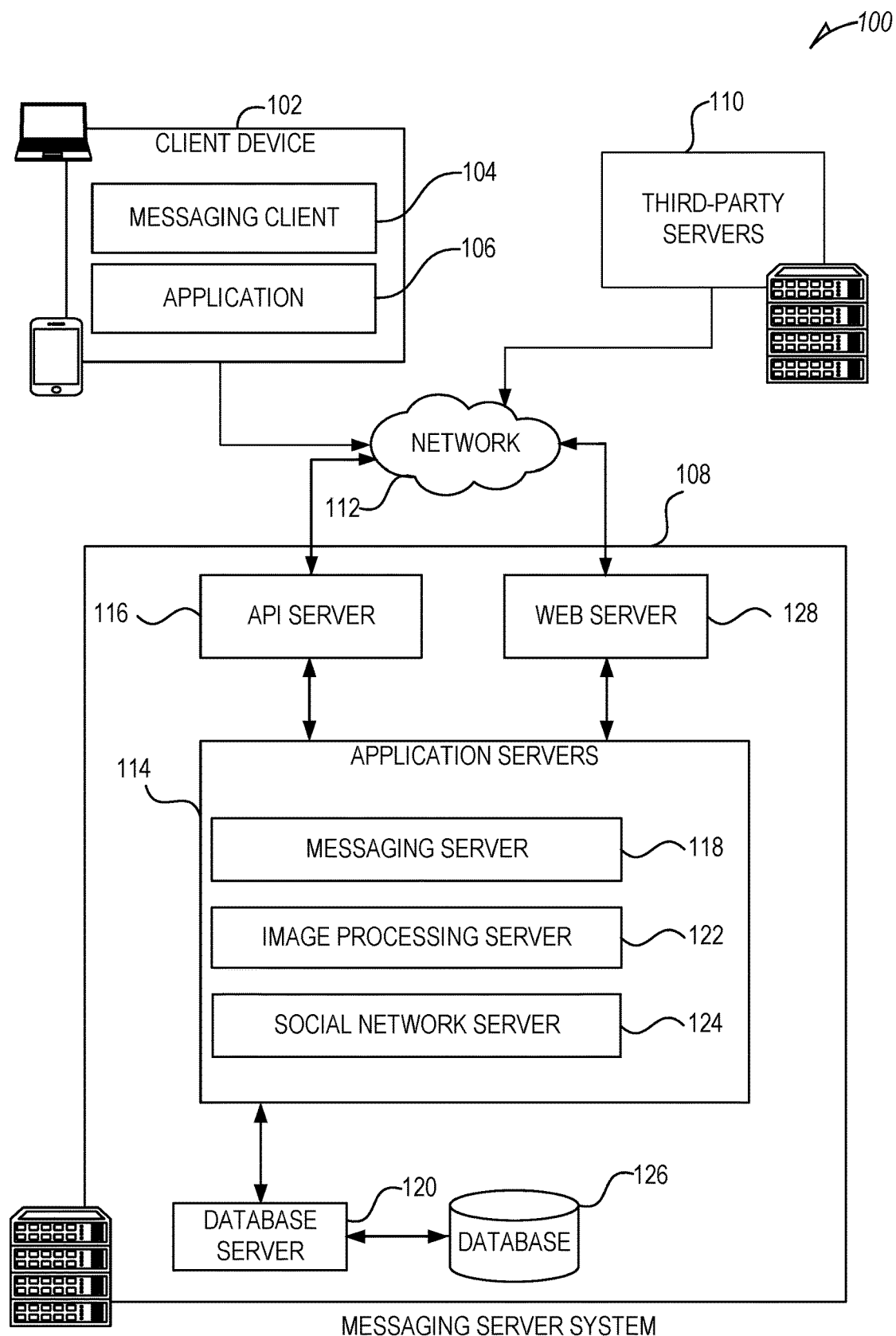
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

One challenge for users of drones 610 and video editors 808 is that increasingly the users want to make their videos 614 and images more compelling to watch or view. But often, the users do not want to spend a lot of time editing their videos 614 and may be overwhelmed with custom UI 816 options. Some examples of the video editor 808 address this challenge by offering editing options to videos 614 based on a flight plan 616 the drone 610 followed in taking the video 614. Additionally, some examples of a video editor 808 address this challenge by providing customized UIs 816 that are specific to a particular video editing effect 812 applied to a video 614. This permits the video editor 808 to present fewer custom UI 816 options to the user because the custom UI 816 options are specific or contextualized to the video editing effects 812 applied to the video 614. Moreover, the challenge is addressed by the video editor 808 adding AR effects 810 to the video 614 or frames of the video 614 in accordance with a flight plan 616 used to capture the video 614.

Figure 6:
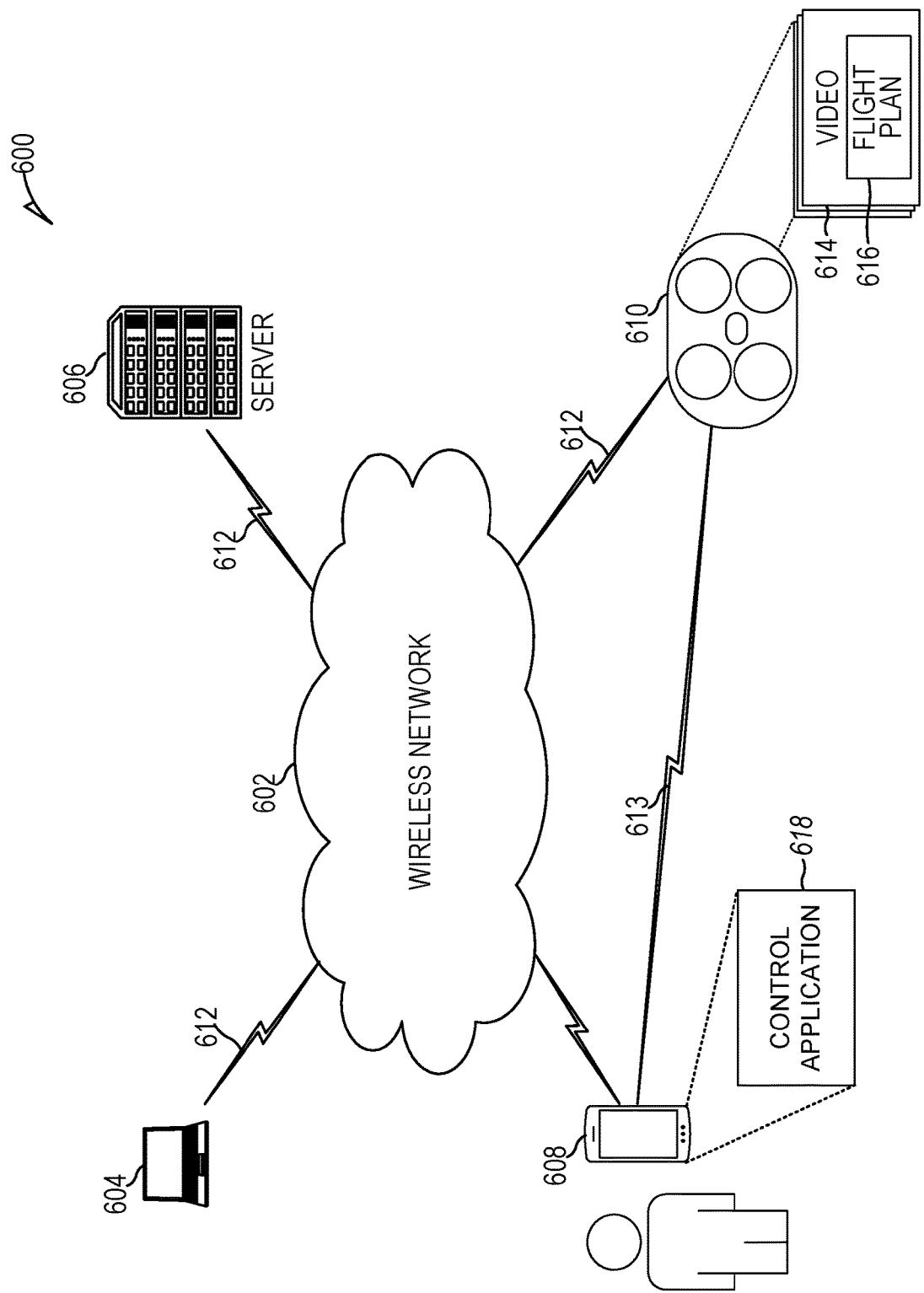
FIG. 6 is a schematic diagram illustrating a system for editing videos captured by electronic devices, in accordance with some examples.
Figure 7:
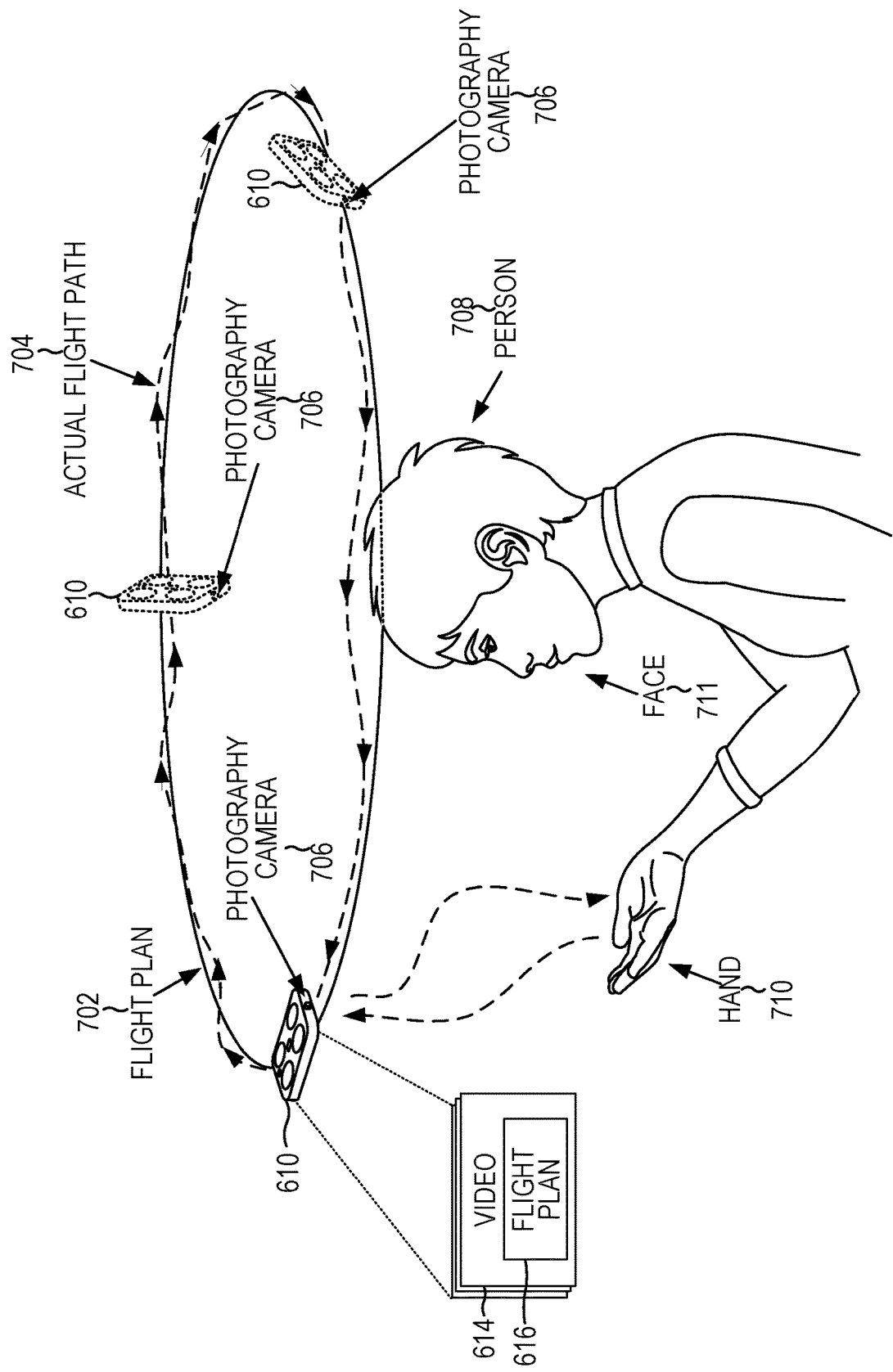
FIG. 7 illustrates a drone flying and capturing a video, in accordance with some examples.
Figure 8:
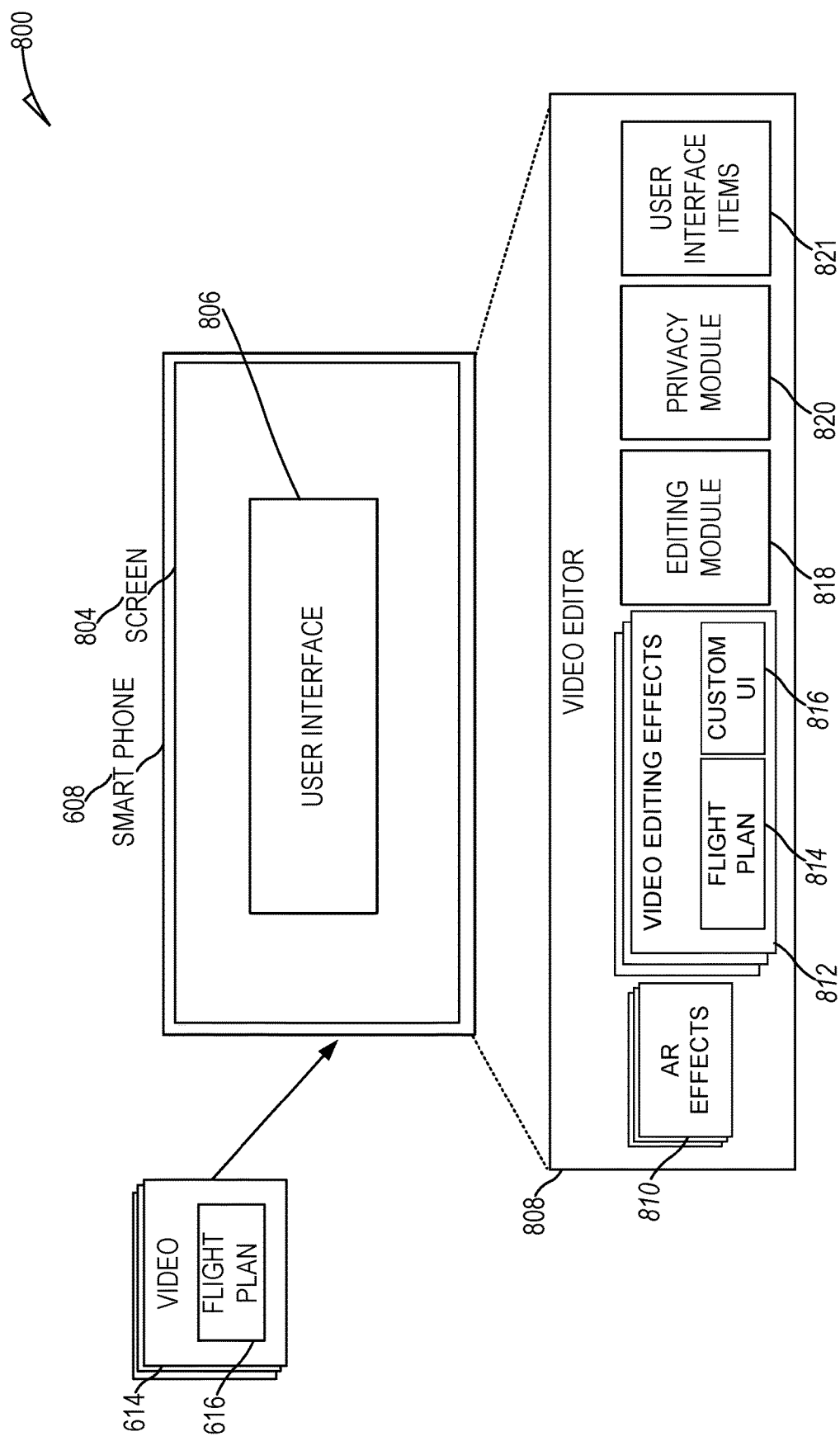
FIG. 8 illustrates a system for editing a video captured by a drone, in accordance with some examples.

Examples that address the challenge include, referring to FIGS. 6-8, a video editor 808 receiving a video 614 taken from a drone 610 where the drone 610 followed an actual flight path 704 based on a flight plan 702 while capturing the video 614. The video editor 808 presents a user interface (UI) 806 that provides user interface items 821 for the user to select video editing effects 812 to the video 614 where the options are based on the flight plan 814 or an actual flight path 704 that was used to take the video 614. Additionally, after the video effects are applied to the video 614, the video editor 808 presents a custom UI 816 to the user to further edit the video 614 where the custom UI 816 is customized in accordance with the video effects used to process the video 614. Moreover, the video editor 808 presents to the user options for adding AR effects 810 to the video where two-dimensional (2D) body tracking and segmentation are used in adding the AR effects 810.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
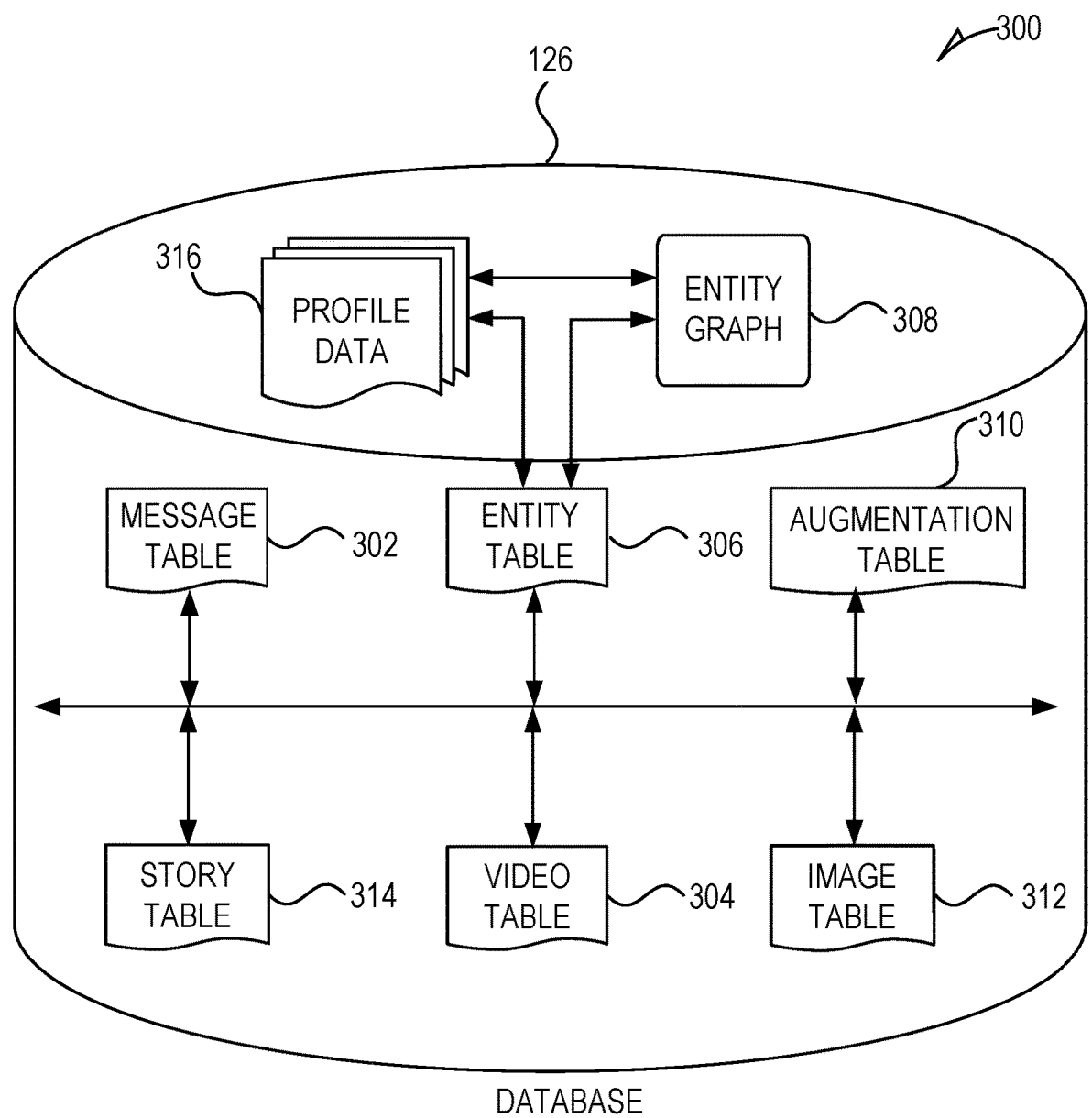
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
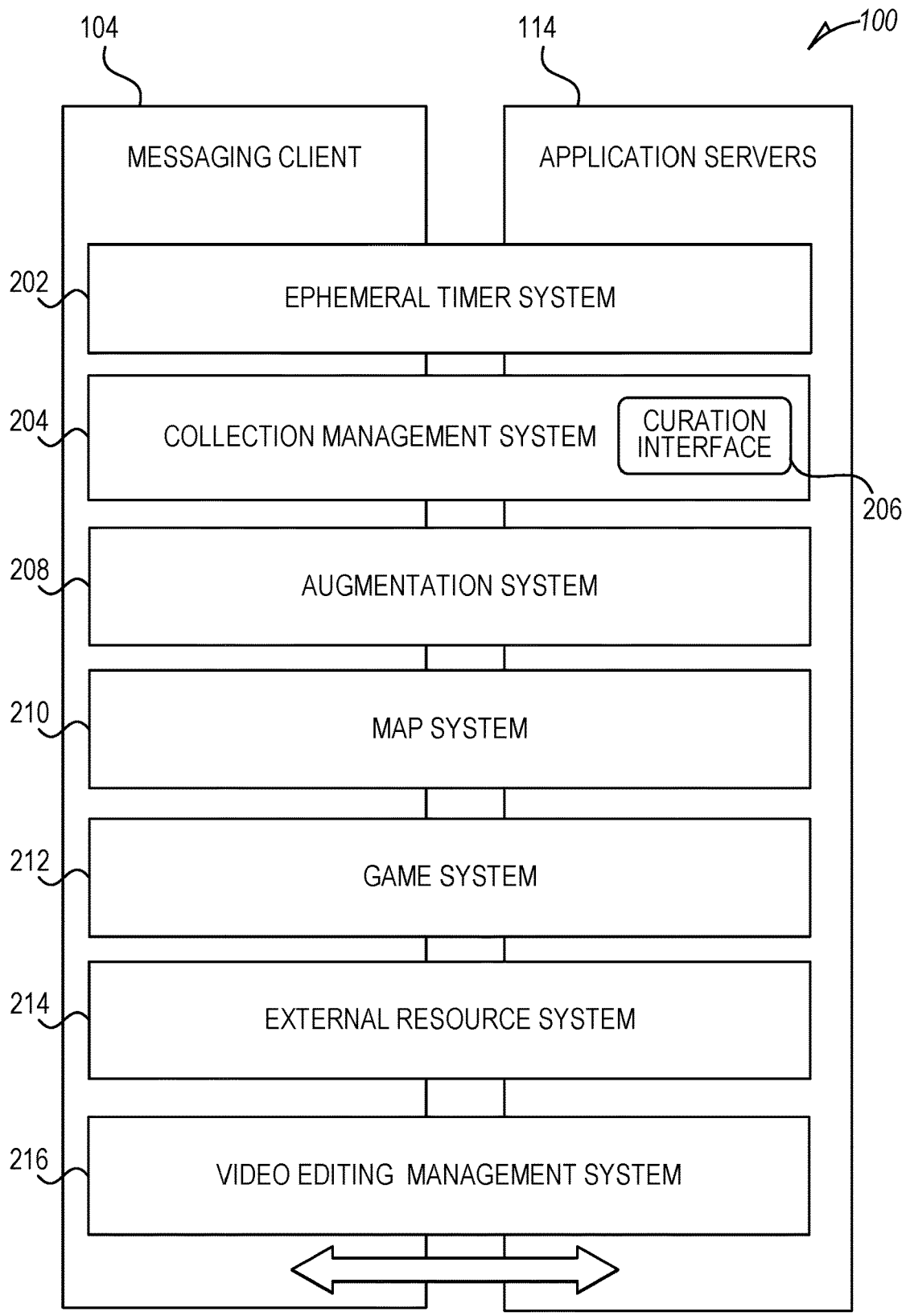
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, a game system 212, an external resource system 214, and a video editing management system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The video editing management system 216 supports, referring to FIG. 6, the system 600 for editing video captured by electronic devices. The video editing management system 216 receives requests from a drone 610, a smartphone 608, an off-site client device 604, or a user device 102, and responds to the requests. The requests include a request to process the video 614 or to send messages among the drone 610, the smartphone 608, the off-site client device 604, or the user device 102. The drone 610, the smartphone 608, the off-site client device 604, and/or the user device 102 may request other services from the video editing management system 216.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular message, at least message sender data, message recipient (or receiver) data, and a payload. Further details regarding information that may be included in a message and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such methods, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with the use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browsing to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcasted by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
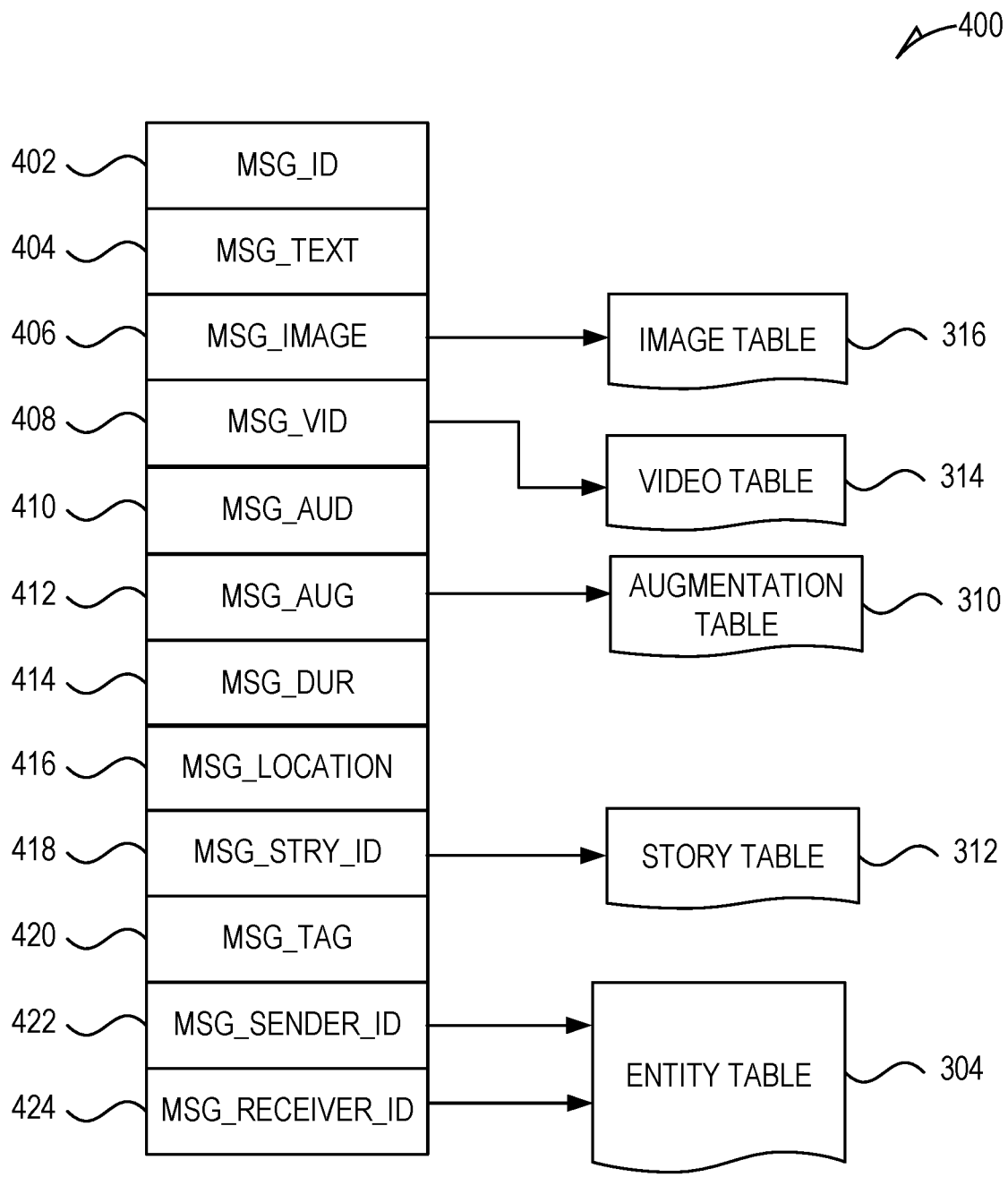
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
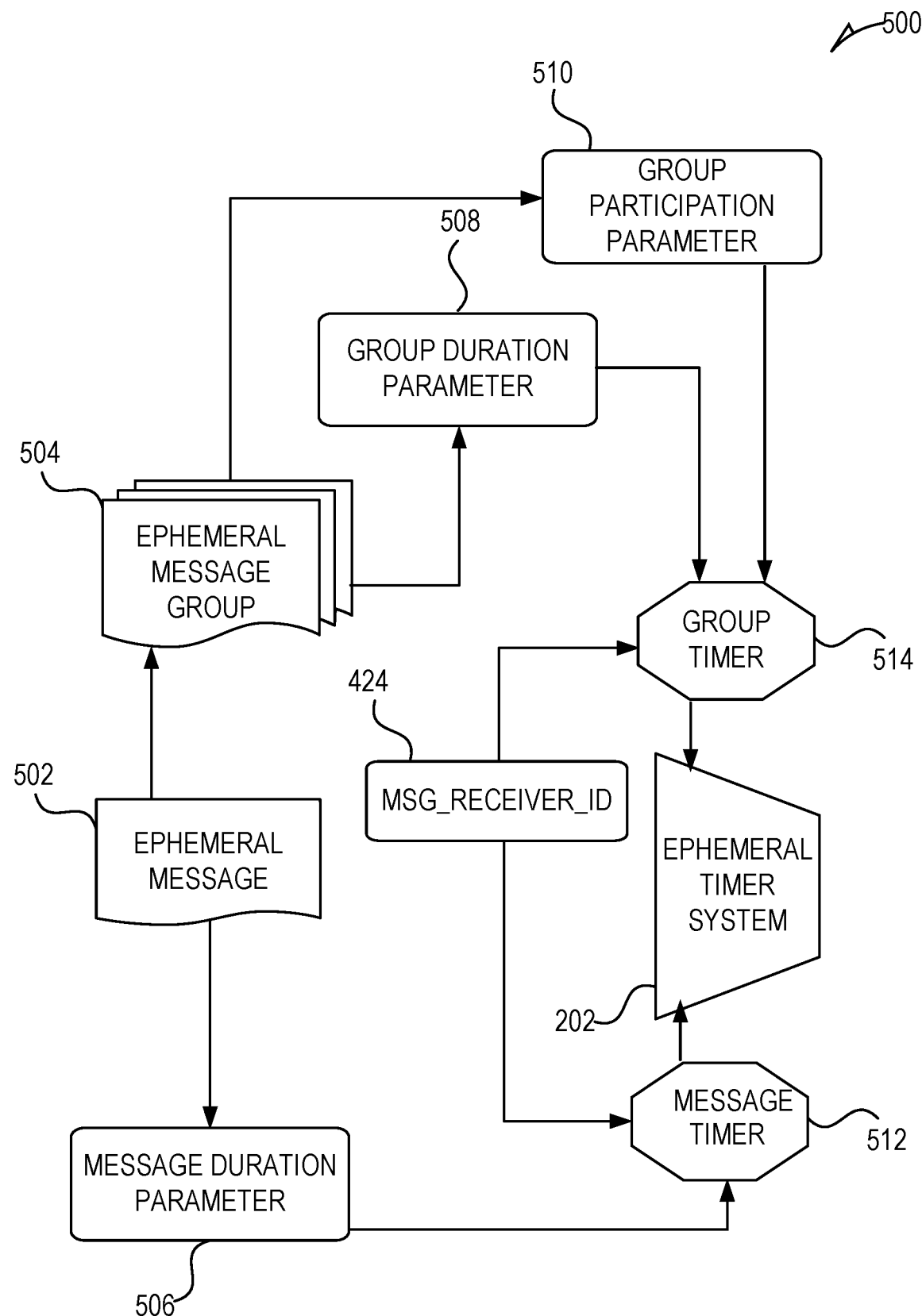
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Editing Video Captured by Electronic Devices

FIG. 6 is a schematic diagram illustrating a system 600 for editing videos captured by electronic devices, in accordance with some examples. In some examples the electronic device is the drone 610, which may be termed an autonomous drone, a semi-autonomous drone, a personal autonomous drone, or another term. The drone 610 communicates by sending communications 612, 613 to a host device such as off-site client device 604, server 606, mobile phone or smartphone 608, or another device. The wireless network 602 is a cellular telephone network such as an LTE network, an IEEE 802.11 network, a BlueTooth® network, or another wireless network using another wireless communication protocol. In some examples, the drone 610 communicates directly with the host device via communications 613 where communications 613 are sent using a communication protocol such as the communication protocols discussed for the wireless network 602.

In some examples, the drone 610 sends communications 612, 613 that includes data such as videos 614 and/or commands or requests to another device such as the smartphone 608. In some examples, communication between the host device such as the smartphone 608 and the drone 610 may be via the wireless network 602. The wireless network 602 includes access to the internet and/or the drone 610 accesses the internet via another connected device such as the smartphone 608, in accordance with some examples.

In some examples, the server 606 provides a social networking service, to enable communication of content such as photos, videos, status updates, media content messages, and the like, directly to social-media sites such as SNAPCHAT® from the drone 610, which may be in flight. In some examples, the server 606 is messaging server system 108 and the video 614 captured by photography camera 706 of FIG. 7 of drone 610 is transmitted via a wireless network 602, which may be in near-real time, to a host device such as the smartphone 608, the servers 606, the client devices 604, or another device. The drone 610 and video editing management system 216 of FIG. 2 communication either directly or via another device, in accordance with some examples.

One or more of the remote-control/host devices such as the smartphone 608 may assist in processing of the video 614 by receiving the video 614 wirelessly, processing the video 614, and then sending back information wirelessly to the drone 610. For example, the smartphone 608 may receive an image from the drone 610 and determine that the image is a landmark such as a museum, restaurant, park, national monument, and so forth. In response, the smartphone 608 sends back information that is used by the drone 610 to assist in a flight plan 616 associated with the landmark. The smartphone 608 contacts the video editing management system 216 to perform the functions for the drone 610, in accordance with some examples. The drone 610 contacts the video editing management system 216 by sending messages to the video editing management system 216 such as store video 614, request an image of the user or purchaser of the drone 610, and so forth.

In some examples, the host device such as the smartphone 608 includes a control application 618 that is used by a user or device to control the drone 610 or send instructions to the drone 610 such as "return to user", "fly according to a flight plan 616", "move to the left", "move to right", "move up or down", "tilt", "take a set of photographs", "turn off", and so forth. The control application 618 provides real-time or near real-time images of the videos 614 that the drone 610 is capturing.

In some examples, the host device acts as a router or passes through messages or packets to other devices connected to the wireless network 602 directly or indirectly. For example, the smartphone 608 receives an image via communications 613 from the drone 610. The smartphone 608 takes the image and sends it to server 606 for posting on a social media site, which may be in near-real time. The server 606 may be hosting the video editing management system 216. A host device such as the smartphone 608 controls a state of the drone 610 by sending instructions to the drone 610 via communications 613, 612, in accordance with some examples. One or more of the remote-control/host devices such as the smartphone 608 receives the video 614 wirelessly or via a cable or another means, and process the video 614 by, for example, with the video editor 808 of FIG. 8 as described herein.

FIG. 7 illustrates a drone 610 flying and capturing a video 614, in accordance with some examples. The drone 610 takes off from the hand 710 and flies in accordance with a flight plan 702 on actual flight path 704 while taking a video 614 with the photography camera 706. The actual flight path 704 may be different than the flight plan 702 because the navigation system of the drone may not be able to maintain the drone 610 exactly on the flight plan 702 for various reasons including wind, control issues, the person 708 moving, and so forth. The video 614 is associated with the flight plan 616, which, in this example, is flight plan 702.

Example flight plans 616 include paths to follow such as to circle or orbit one or more users, follow a predetermined route around or near a user or object where the path may be designed to capture a video or photograph, 360-degree fly around above the user, hover in front of the user, hover in front of the user and bounce, hover in front of a user and move forwards and backwards, go to a destination and return, go to a destination and circle the destination for a video, follow a user, and so forth.

The term user is used but one skilled in the art will recognize the drone 610 may identify a group of people and perform the flight plan 702 in accordance with a position of a group of people or an object. The preprogrammed flight plan 702 may include a target distance from a person associated with the face 711 and a target height of the drone above a person 708 ground.

FIG. 8 illustrates a system 800 for editing a video captured by a drone, in accordance with some examples. The smartphone 608 receives video 614, which includes an indication of a flight plan 616 that a drone 610 flew in capturing the video 614. In some examples, the video 614 includes an actual path the drone 610 flew in capturing the video 614. For example, as discussed in conjunction with FIG. 7, the actual flight path 704 may be different than the flight plan 702. The drone 610 may record information about the actual flight path 704 such as a GPS location or a distance from the face 711 of the person 708. For example, the drone 610 may record a distance from the face 711 every $1/10$ of second to 1 second, or another time period and include these distances with the flight plan 616.

The screen 804 is an electronic device for displaying information on the smartphone 608. The video editor 808 is used to edit videos 614 by processing the videos 614 with AR effects 810 and video editing effects 812. The user interface 806 is information presented by the video editor 808 to provide user interface items 821 and custom UIs 816.

The term AR graphics includes anything displayed by the screen 804 for the user to view in conjunction with viewing the video 614. The editing module 818 when adding AR effects 810 may adjust the AR effects 810 so that the AR effects 810 appear to be in a position within the video 614.

The video editing effects 812 are associated with a flight plan 814 and custom UI 816. For example, a video 614 is associated with a flight plan 616 and the video editor 808 then offers video editing effects 812 based on the flight plan 616. The video editing effects 812 are associated with a custom UI 816. The video editor 808 presents the custom UI 816 to a user when editing videos 614 that have already had the corresponding video editing effects 812 applied to the video 614. The custom UI 816 associated with the video editing effects 812 provides user interface items 821 for editing videos 614 that have had the video editing effects 812 applied to them.

The editing module 818 is configured to manage the user interface 806 by providing the option for the user to select a user interface item 821 and respond according to the selection. The AR effects 810 include "pixie dust", "flame", "shattered crystals", "hearts", "paint strokes", "trippy", "heart in the sky", "clones", "fireworks", "vhs", "giant", and so forth. The video editing effects 812 include "timelapse", "bounce", "jump cut", "3D effects", and so forth. AR effects 810 are computer-generated effects that the video editor 808 layers over the real-life image displayed on the screen 804. In some examples, the AR effects 810 are graphics added to the frames of the video 614. In some examples, the AR effects 810 are graphics that are generated to appear to be part of the frames of the video 614. For example, the AR effects 810 may have shadowing added to match the frames of the video 614. In some examples, the AR effects 810 include one or more of adding pixie dust, adding a flame around a person, turning a person into shattered crystals, adding hearts around a person, adding paint strokes in accordance with an arm movement of a person, merging frames of the video together to add multiple copies of a person and changing colors of clothing of the person.

The privacy module 820 is configured to request consent before editing or posting the video 614 to a social media account. The privacy module 820 customizes the editing available to limit some editing for children that are under a certain age such as 15 years old, in accordance with some examples. The video editor 808 calls the privacy module 820 before video 614 are edited, stored, and/or transmitted, in accordance with some examples.

In other examples, the server 606 of FIG. 6 performs some of the functionality described in conjunction with FIG. 8 and herein. In some examples, the video editor 808 operates on a different device such the off-site client device 604 (such as a laptop or desktop computer), server 606, or another computing device. In some examples, the video editor 808 processes the video 614 to determine the flight plan 616 that was used to capture the video 614 from a number of predetermined flight plans.

Figure 9:
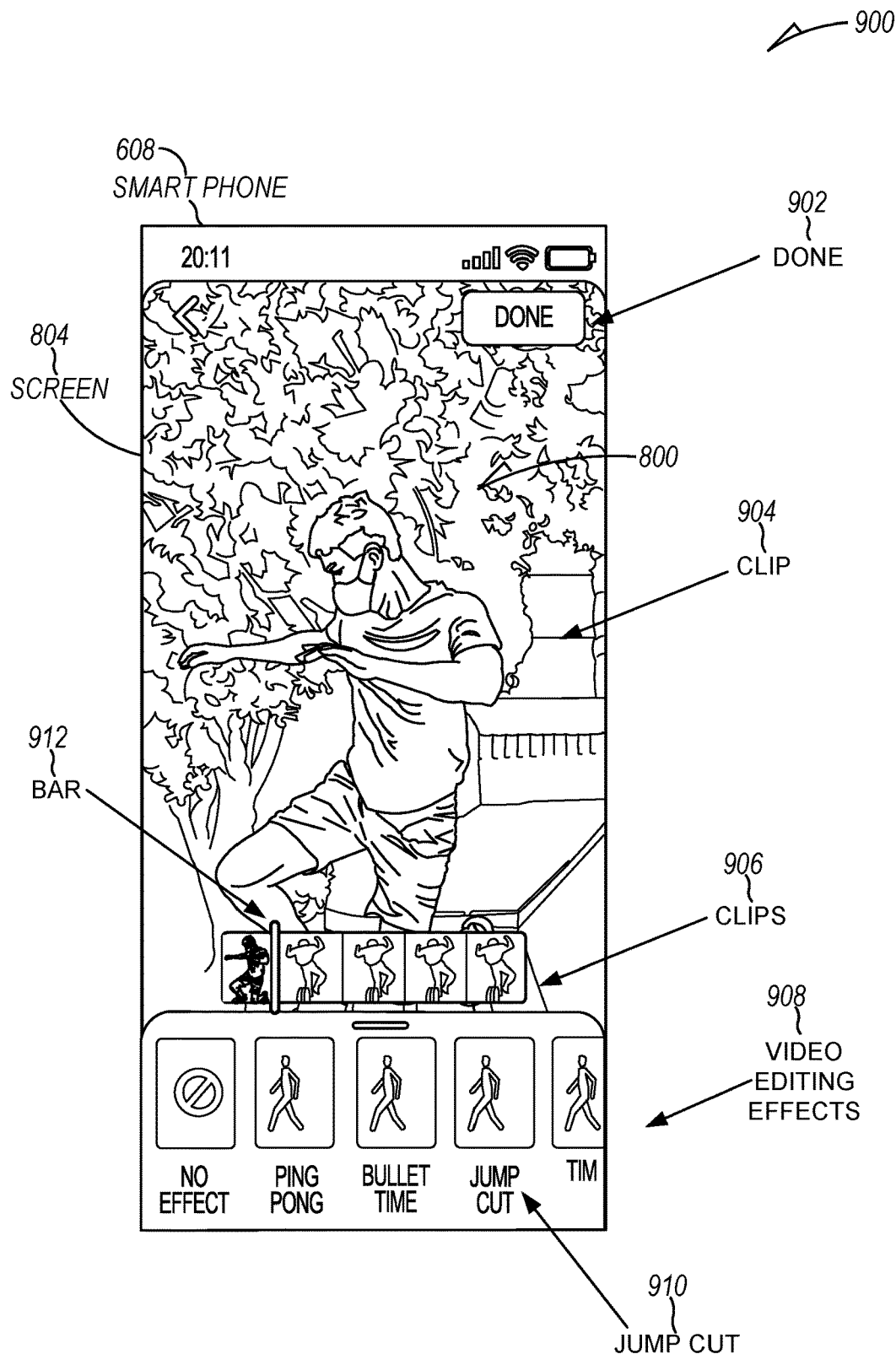
FIG. 9 illustrates a user interface for video editing effects, in accordance with some examples.

FIG. 9 illustrates a user interface 900 for video editing effects, in accordance with some examples. Displayed on the screen 804 is a user interface 806 of FIG. 8 with a clip 904 of the video 614 playing. The video editing effects 908 are the same or similar as video editing effects 812. The editing module 818 presents the video editing effects 908 that are available for the video 614 being edited. The selection of "jump cut" 910 illustrates that the user has selected the video editing effects 812 of "jump cut". The editing module 818 is displaying display of clips 906, which is a custom UI 816 that is designed for the "jump cut" video editing effects 812 and, in some examples, replaces a standard UI of a timeline of the video 614. The editing module 818 generates the edited video with "jump cut" by processing the video sequentially and repeatedly including first portions of the video 614 in the edited video and skipping second portions of the video 614.

The flight plan 616 of the video 614 being edited by the video editor 808 in the user interface 900 is a 360-degree circle above the head of a user. The flight plan 616 may be termed an "Orbit" flight plan 814.

The editing module 818 performs the following processing or editing to the video 614 in response to the selection of "jump cut" 910 by the user. The editing module 818 grabs a one second clip of the video 614, skips two seconds of the video 614, grabs a one second clip of the video 614, skips two seconds of the video 614, and so forth, until the end of the video 614. The duration of the clips may be different than one second. The duration of the skips may be different than two seconds. In some examples, the durations of the clips and skips vary in accordance with properties of the video 614 such as the quality of the frames of the video 614 compared with neighboring frames of the video 614. For example, a one second clip may be 0.99 seconds with several frames of the video removed due to poor image quality. The editing module 818 displays only the grabbed clips 906, which may be termed segments rather than clips or another name. The bar 912 indicates the current clip of the five clips 906 illustrated. The user may apply additional video editing effects 812 and/or AR effects 810 to the clips of the display of clips 906. Tapping done 902 completes the editing and saves the edited video of the video 614 with options to transmit the edited video to a social media account and additional editing. In some examples, tapping the background is similar to or the same as tapping done 902.

Figure 10:
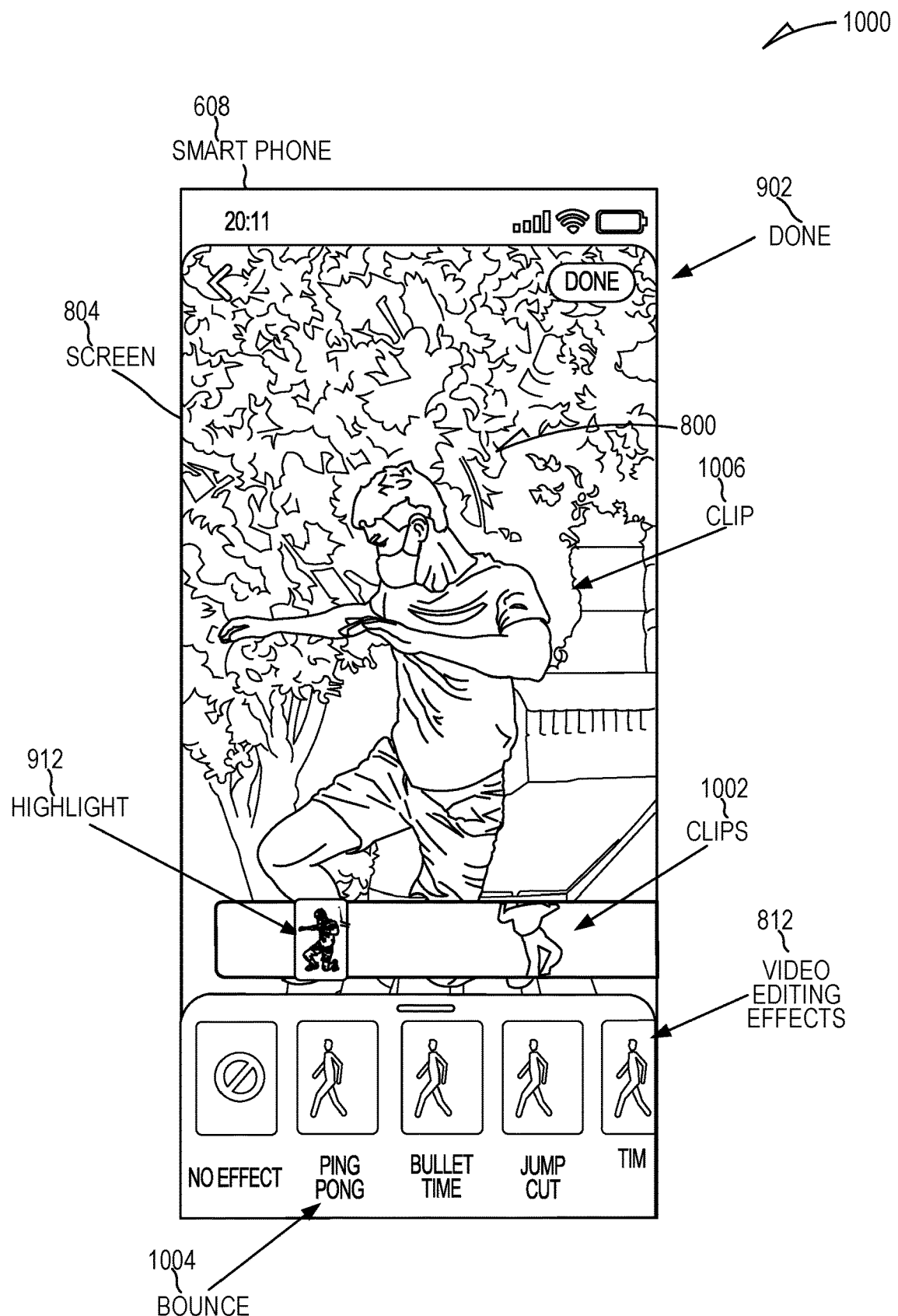
FIG. 10 illustrates a user interface for video editing effects, in accordance with some examples.

FIG. 10 illustrates a user interface 1000 for video editing effects, in accordance with some examples. The video editor 808 is displaying on the screen 804 a user interface 806 with a clip 1006 of the video 614 playing. The editing module 818 presents the video editing effects 812 that are available for the video 614 being edited in the user interface 900. The selection of "bounce" 1004 illustrates that the user has selected the video editing effects 812 of "bounce". The display of clips 1002 is a custom UI 816 that is designed for the "bounce" video editing effects 812 and, in some examples, replaces a standard UI for the video 614. The user interface 1000 may be used for the "bounce" or "3D Orbit" video editing effects 812.

The highlight or bar 912 represents the "selected" portion of the edited video. The bar 912 has a fixed width and a fixed position. In some examples, the video editor 808 applies the "bounce" 1004 video editing effects 812 by selecting 20 frames, which may be termed pictures or another term, to include in the edited video from the video 614. The video editor 808 may select a different number of frames. The video editor 808 selects the frames based on a quality of the frame and a placement of the frame within the video 614. Additionally, in some examples, the video editor 808 selects the frames based on the flight plan 814. For example, if the flight plan 814 is a hover in front of a person and come towards and backwards from the person, then the video editor 808 may select frames based on a size of the person within the frame as well as based on a timeline of the video 614 relative to the flight plan 814. If the flight plan 814 is a 360-degree orbit above and around the user, then the video editor 808 choses frames based on a quality of the frame and based on representing the entire three-hundred and sixty degrees of the flight plan 814. If the flight plan 814 is a path away from or toward a person or object, then the video editor 808 generates the edited video by selecting a fixed number of frames from the video 614 along the path away from or toward the person or object. In some examples, the video editor 808 processes the video 614 based on 2-dimensional body tracking and segmentation masks. For example, the video editor 808 may use a neural network module trained to identify people and faces within images and to segment an image. In some examples, the editing module 818 processes the person in the frames by enlarging the person to a size of one and a half times a height of the person to five times the height of the person.

While the user is holding the highlight bar 912 still, the editing module 818 will pause the video 614 and as the user drags the highlight bar 912, the editing module 818 shows the frame where the "bounce" video editing effects 812 will start. The editing module 818 stores information that indicates the "bounce" or "3D Orbit" video editing effects 812 in the header of the video 614, in accordance with some examples.

Figure 11:
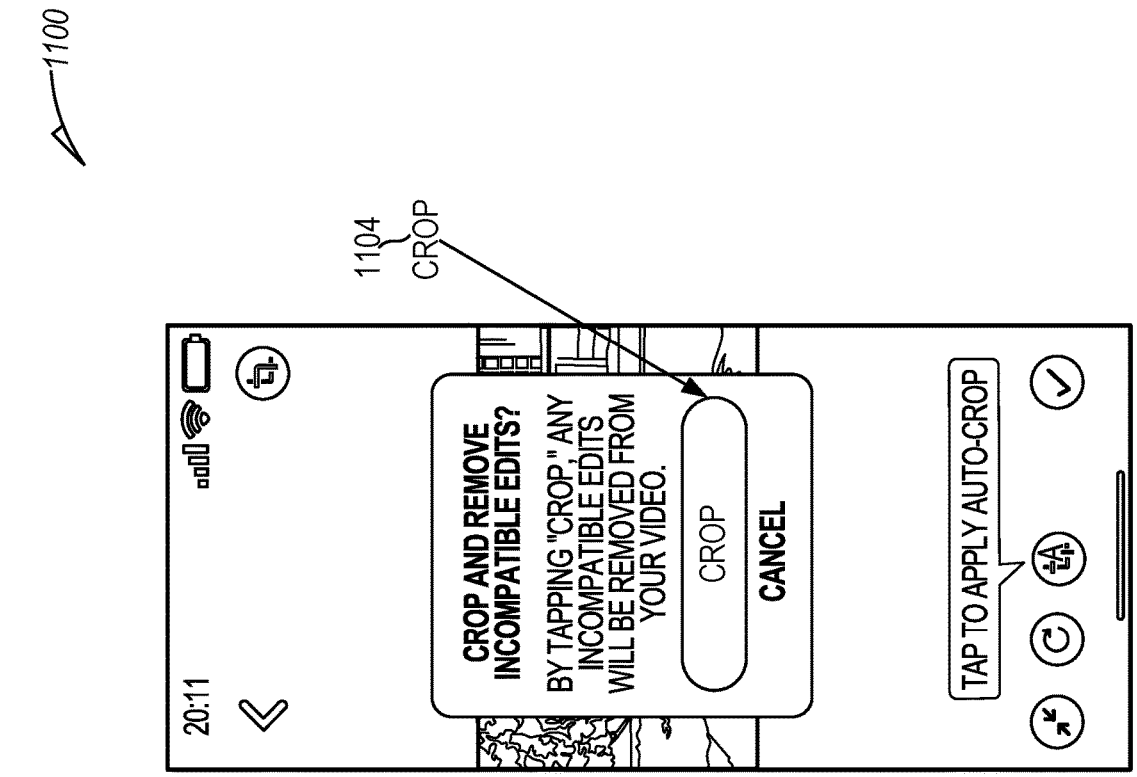
FIG. 11 illustrates resolving incompatible edits, in accordance with some examples.
Figure 11:
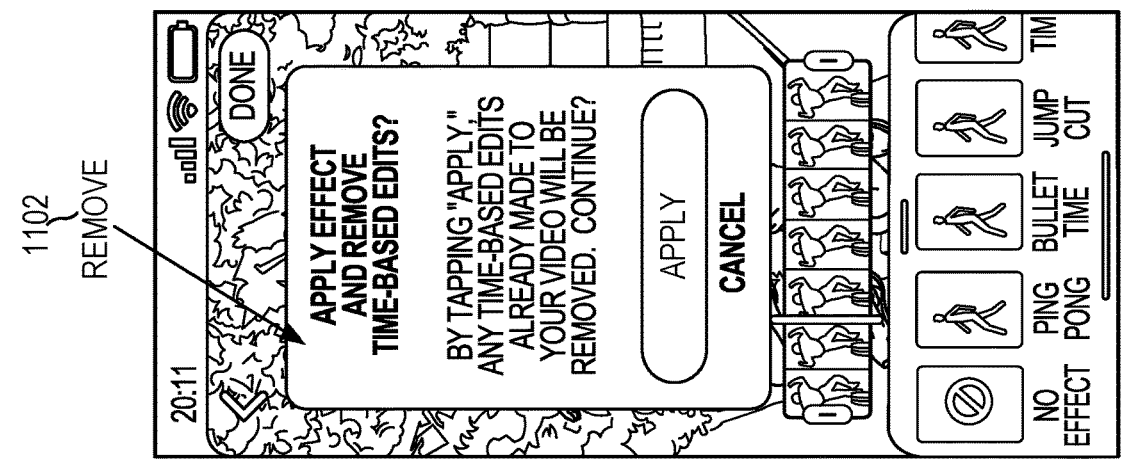

FIG. 11 illustrates resolving incompatible edits 1100, in accordance with some examples. Time-based video editing effects 812 such as "jump cut", "bounce", and "3D Orbit", may be incompatible with other video editing such as auto-crop, smart edit effects, speed filters, time-based UCO applications and so forth.

The video editor 808 uses a dialogue that will alert users to the problem. The video editor 808 offers the user the option to remove 1102 the video editing effects 812. If the user selects "apply", then the video editor 808 removes the applied video editing effects 812. The user may also select "cancel".

If the video editor 808 determines that two video editing effects 812 are incompatible, then the video editor 808 offers the user the option to remove video editing effects 812 that are incompatible with a current selection of a video editing effect 812. For example, if a user selects to "crop" an edited video 614 and "AR effects" have been applied to the edited video 614 that are incompatible with a "crop" 1104 video editing effect 812, then the video editor 808 offers the user the option of removing the incompatible video editing effect 812 of "AR effects", so that the video editor 808 can apply the "crop" video editing effect 812.

Figure 12:
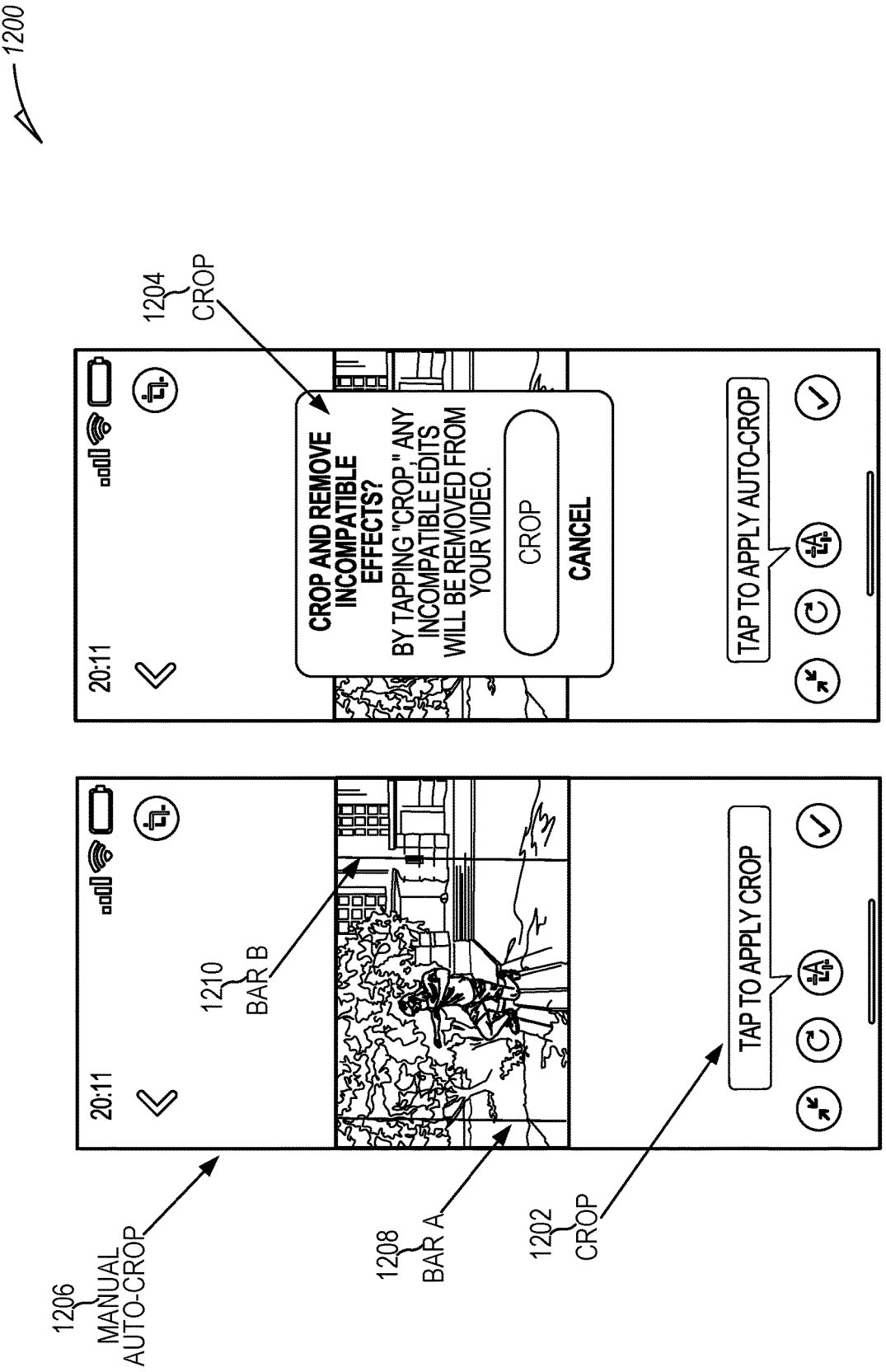
FIG. 12 illustrates applying auto-crop manually, in accordance with some examples.

FIG. 12 illustrates applying auto-crop manually 1200, in accordance with some examples. A user is applying a manual auto-crop 1206 to a frame of an edited video 614 between bar A 1208 and bar B 1210. If the user attempts to "crop" 1202, the video editor 808 may indicate that the frame to be cropped has been edited with an incompatible video editing effect 812. The video editor 808 offer the user the opportunity to "crop" 1204 the frame and remove the incompatible video editing effect 812. If the user selects "Crop" 1204, then the video editor 808 removes video editing effects 812 that are incompatible with the "crop" 1202 video editing effect 812 for the frame of the edited video 614.

Figure 13:
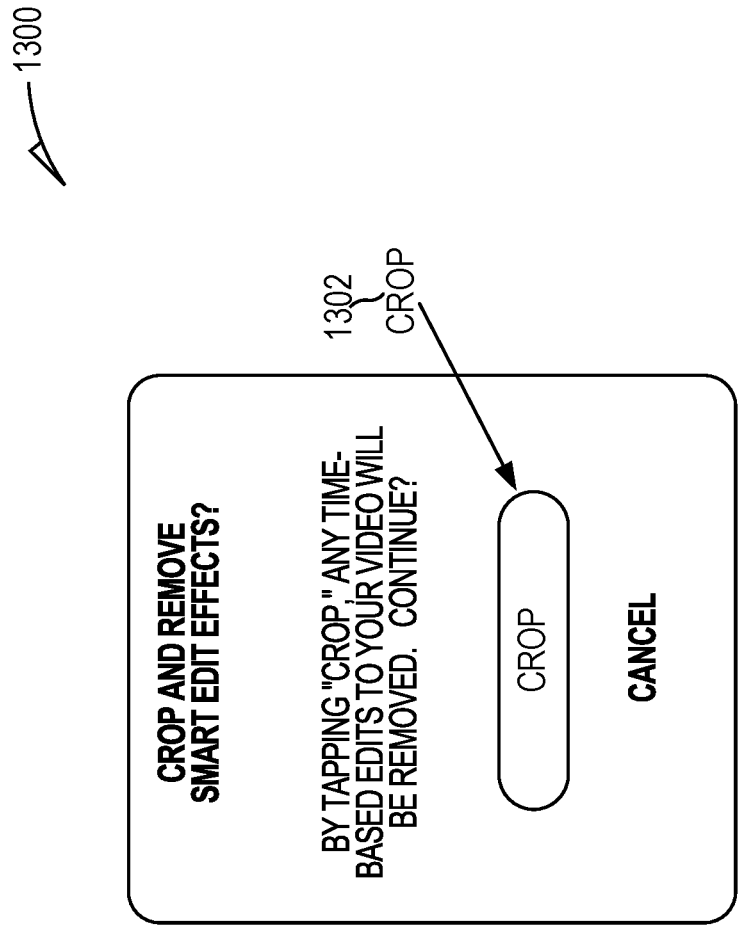
FIG. 13 illustrates applying cropping and removing time-based edits, in accordance with some examples.

FIG. 13 illustrates applying cropping and removing time-based edits 1300, in accordance with some examples. Some of the video editing effects 812 are operating system dependent. For example, with Android®, time edited videos 614 are not compatible with some applications. The editing module 818 will also remove incompatible video editing effects 812 if "crop" 1302 is selected. In some examples, the editing module 818 maintains data with the edited video 614 that enables the editing module 818 to reverse the video editing effects 812 applied to the edited video 614. The editing module 818 may be called to remove the video editing effects 812 by another application. As illustrated, the user is trying to play the edit video 614 in a video playing application, which needs to "crop" the edited video 614. But the application cannot "crop" the edited video 614 due to the video editing effects 812 applied to the edited video 614 by the editing module 818. The editing module 818 is called by the video playing application to remove incompatible video editing effects 812. The user selects "crop" 1302 to have the incompatible video editing effects 812 removed from the edited video 614.

Additionally, in some examples, the editing module 818 maintains an indication of which video editing effects 812 have been applied to an edit video 614. The editing module 818 then filters out application that would be incompatible with the edited video 614 due to the video editing effects 812 applied to the edited video 614. For example, an application may be grayed out to indicate that it cannot be used with the edited video 614 where an option may be presented by the editing module 818 to remove the video editing effects 812 so that the application may be used with the edited video 614. Additionally, the video editor 808 may gray out or not present user interface items 821 that would select video editing effects 812 to the edited video 614 that were incompatible. Often video editing effects 812 that are time-based on not compatible with other applications.

Figure 14:
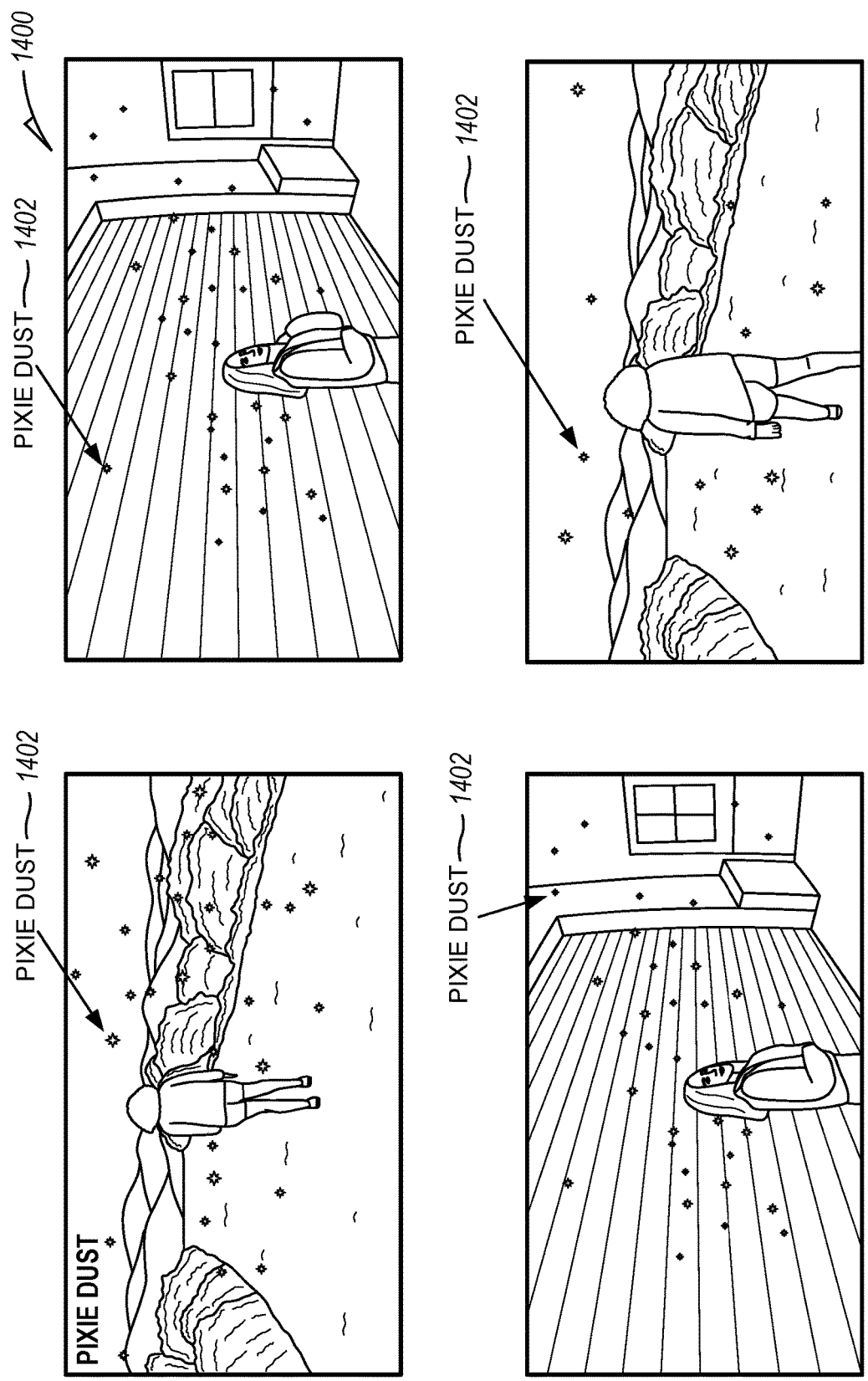
FIG. 14 illustrates an AR effect, in accordance with some examples.

FIG. 14 illustrates an AR effect 1400, in accordance with some examples. The AR effect 810 may be termed "pixie dust" as illustrated at 1402. The AR effect 810 is applied to the video 614 or frame by the editing module 818. The editing module 818 uses segmentation maps and/or 2D body tracking, in accordance with some examples. In some examples, the user selects an area to apply the "pixie dust", which may light areas of the images to appear to be "pixie dust". The user may select an object or person in the image or the entire image for the "pixie dust" to be applied. The editing module 818 uses the flight plan 814 to assist in locating or tracking an area to apply the "pixie dust", in accordance with some examples. For example, if the flight plan 814 is a 360-degree orbit above and around the user, the "pixie dust" is applied in a 360-degree pattern around the user.

Figure 15:
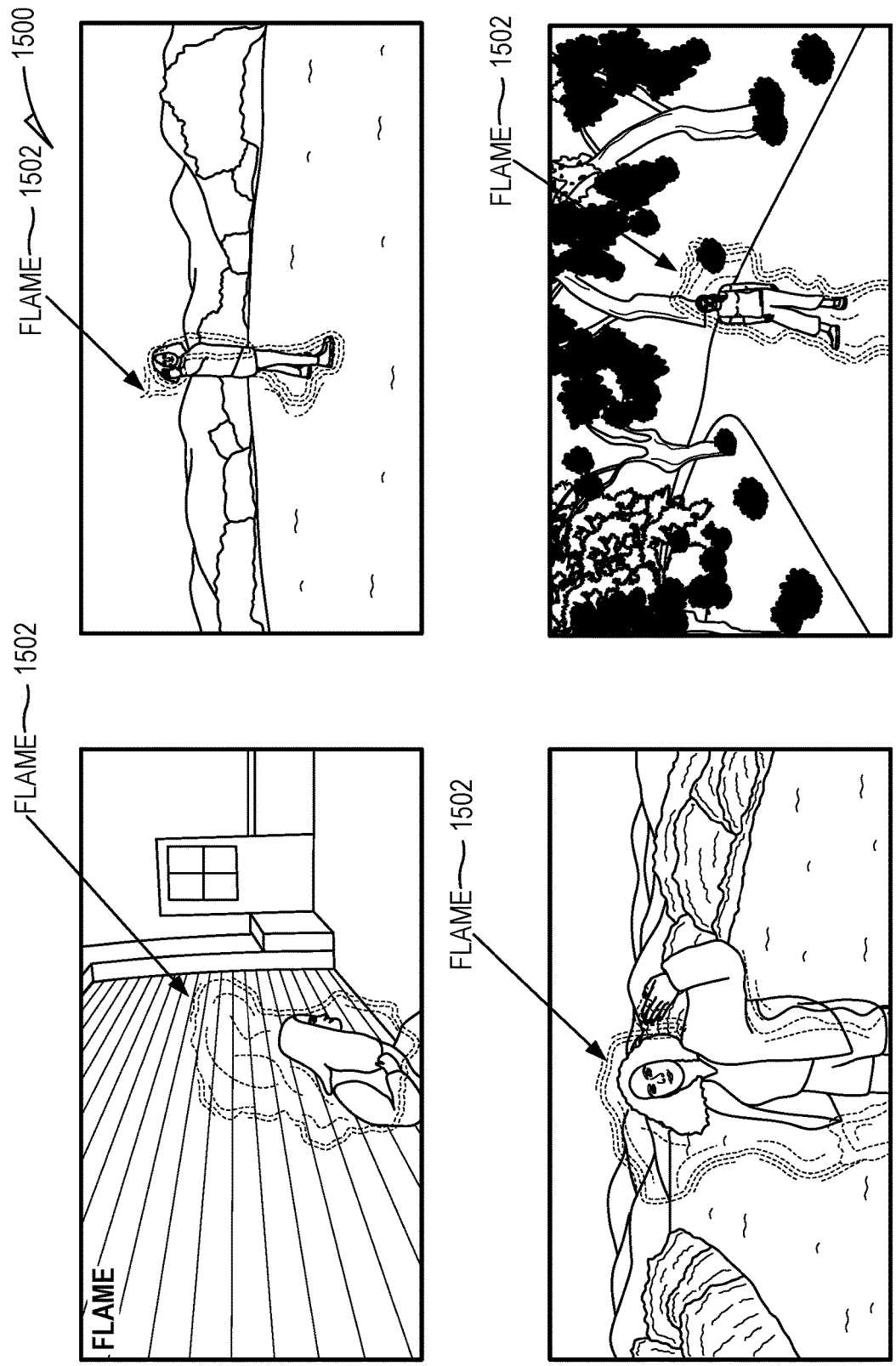
FIG. 15 illustrates an AR effect, in accordance with some examples.

FIG. 15 illustrates an AR effect 1500, in accordance with some examples. The AR effect 810 may be termed "flame" as illustrated at 1502. The AR effect 810 is applied to the video 614 or frame by the editing module 818. The editing module 818 uses segmentation maps and/or 2D body tracking, in accordance with some examples. In some examples, the user selects an area to apply the "flame", which makes the person or object of the video 614 or frame (image) to appear to have a "flame" 1502 around them and/or be part of them. The user may select an object or person in the image or the entire image for the "flame" to be applied. The editing module 818 uses the flight plan 814 to assist in locating or tracking an area to apply the "flame", in accordance with some examples. For example, if the flight plan 814 is a 360-degree orbit above and around the user, the "flame" is applied in a 360-degree pattern around the user.

Figure 16:
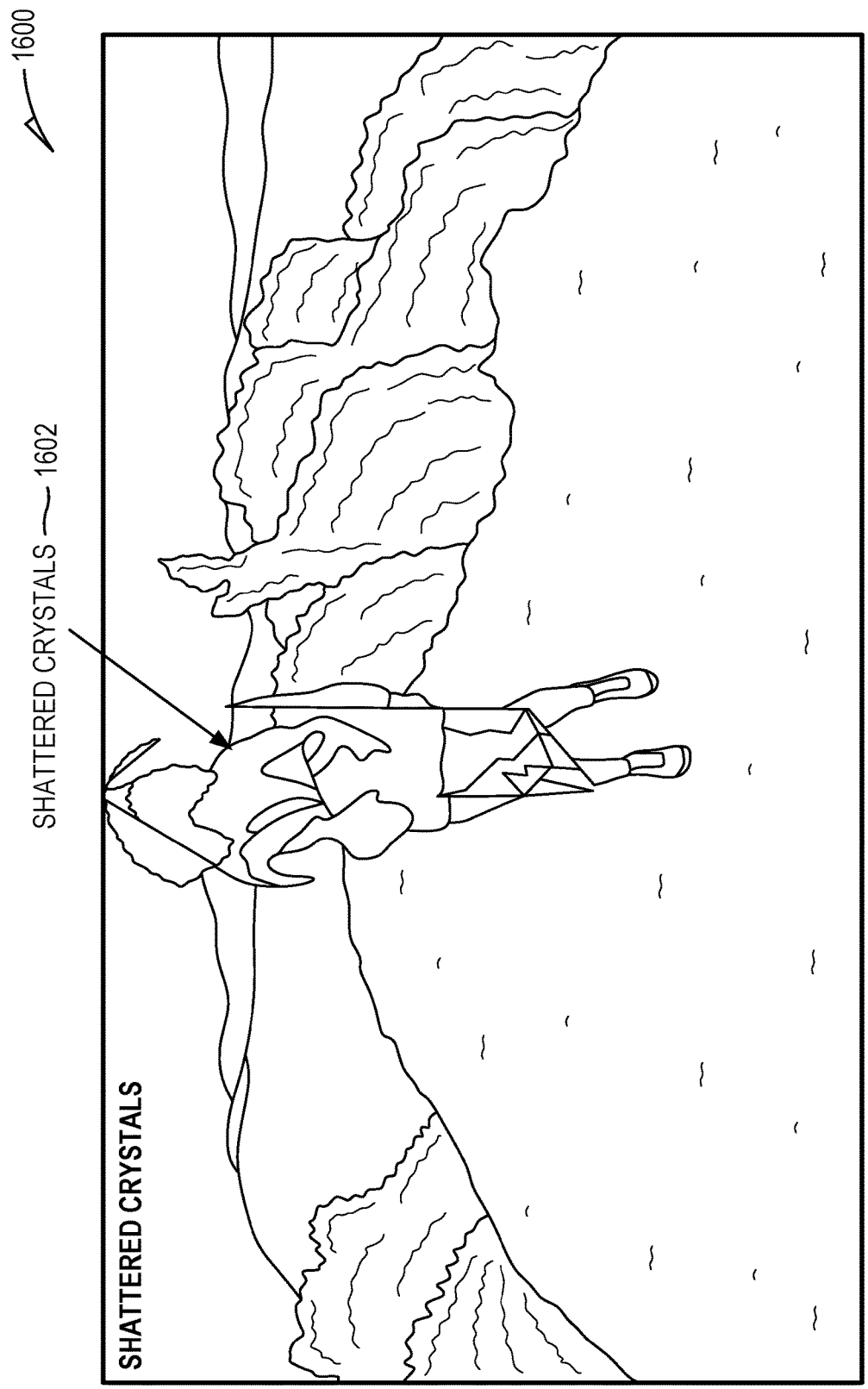
FIG. 16 illustrates an AR effect, in accordance with some examples.

FIG. 16 illustrates an AR effect 1600, in accordance with some examples. The AR effect 810 may be termed "shatter crystal" as illustrated at 1602. The AR effect 810 is applied to the video 614 or frame by the editing module 818. The editing module 818 uses segmentation maps and/or 2D body tracking, in accordance with some examples. In some examples, the user selects an area, object, or person to apply the "shattered crystal" 1602, which turns the area, object, or person of the video 614 or frame (image) to appear to be crystalized with different crystal structures from their original colors where the colors may be changed or blended with crystal colors to appear to be "shatter crystals" 1602. The user may select an area, object, or person in the image or the entire image for the "shatter crystals" 1602 to be applied. The editing module 818 uses the flight plan 814 to assist in locating or tracking an area, object, or person to apply the "shattered crystals", in accordance with some examples. The editing module 818 uses mathematical representations of crystals, which may be shattered crystals, to map the area, object, or person of the video 614 or frame onto and modify the images of the video 614 or frame.

Figure 17:
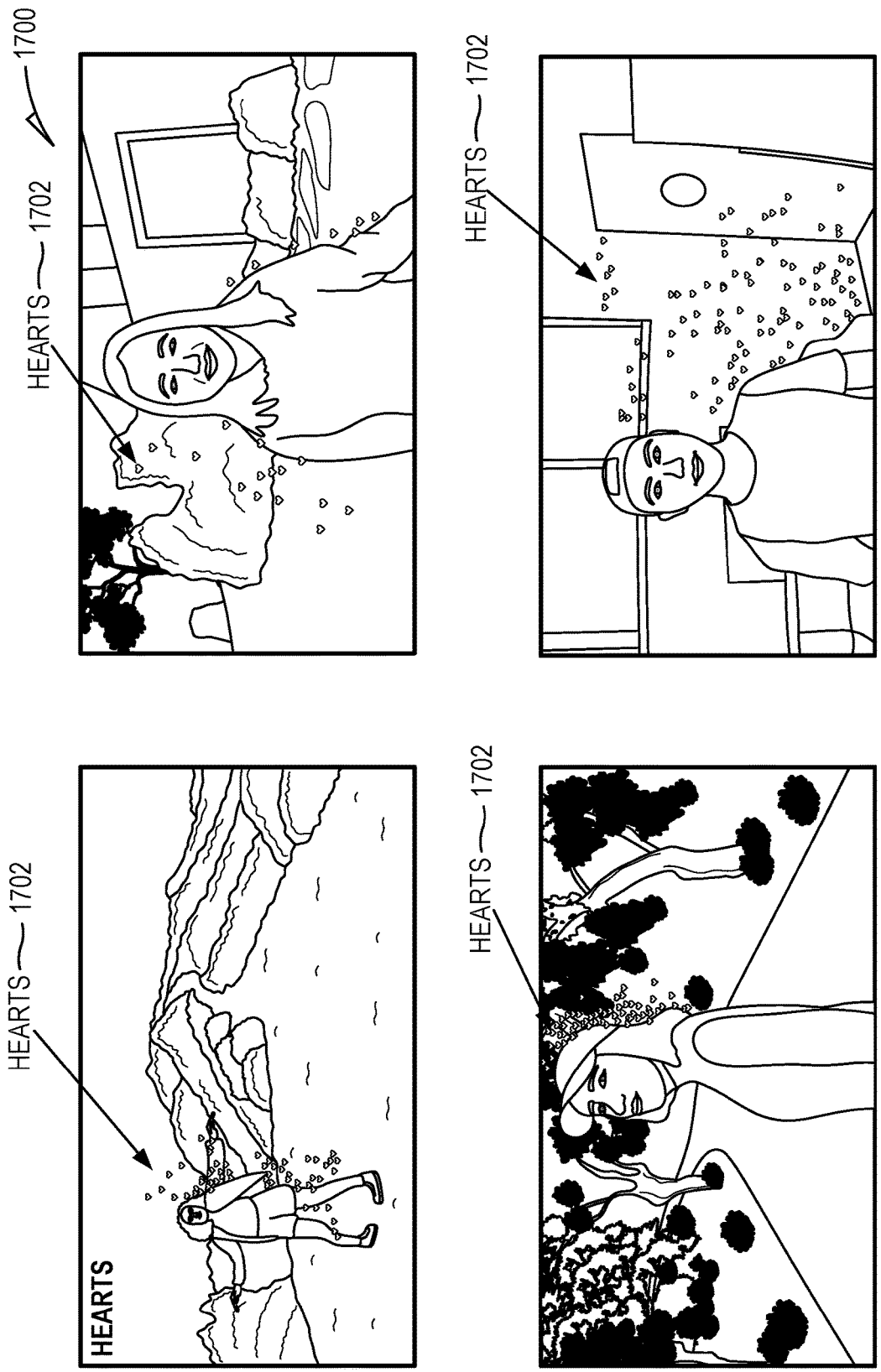
FIG. 17 illustrates an AR effect, in accordance with some examples.

FIG. 17 illustrates an AR effect 1700, in accordance with some examples. The selected AR effect 810 may be termed "hearts" as illustrated at 1702. The AR effect 810 is applied to the video 614 or frame by the editing module 818. The editing module 818 uses segmentation maps and/or 2D body tracking, in accordance with some examples. In some examples, the user selects an area, object, or person to apply the "hearts", which turns the area, object, or person of the video 614 or the frame (image) to have images of hearts added around the area, object, or person. The "hearts" 1702 may be clustered and the location of the "hearts" 1702 may be based on shadows in the image. The user may select an area, object, or person in the image or the entire image for the "hearts" 1702 to be applied. The editing module 818 uses the flight plan 814 to assist in locating or tracking an area, object, or person to apply the "hearts", in accordance with some examples. For example, if the flight plan 814 is a 360-degree orbit above and around the user, the "hearts" are applied in a 360-degree pattern around the user. The editing module 818 adds three-dimensional AR hearts, in accordance with examples.

Figure 18:
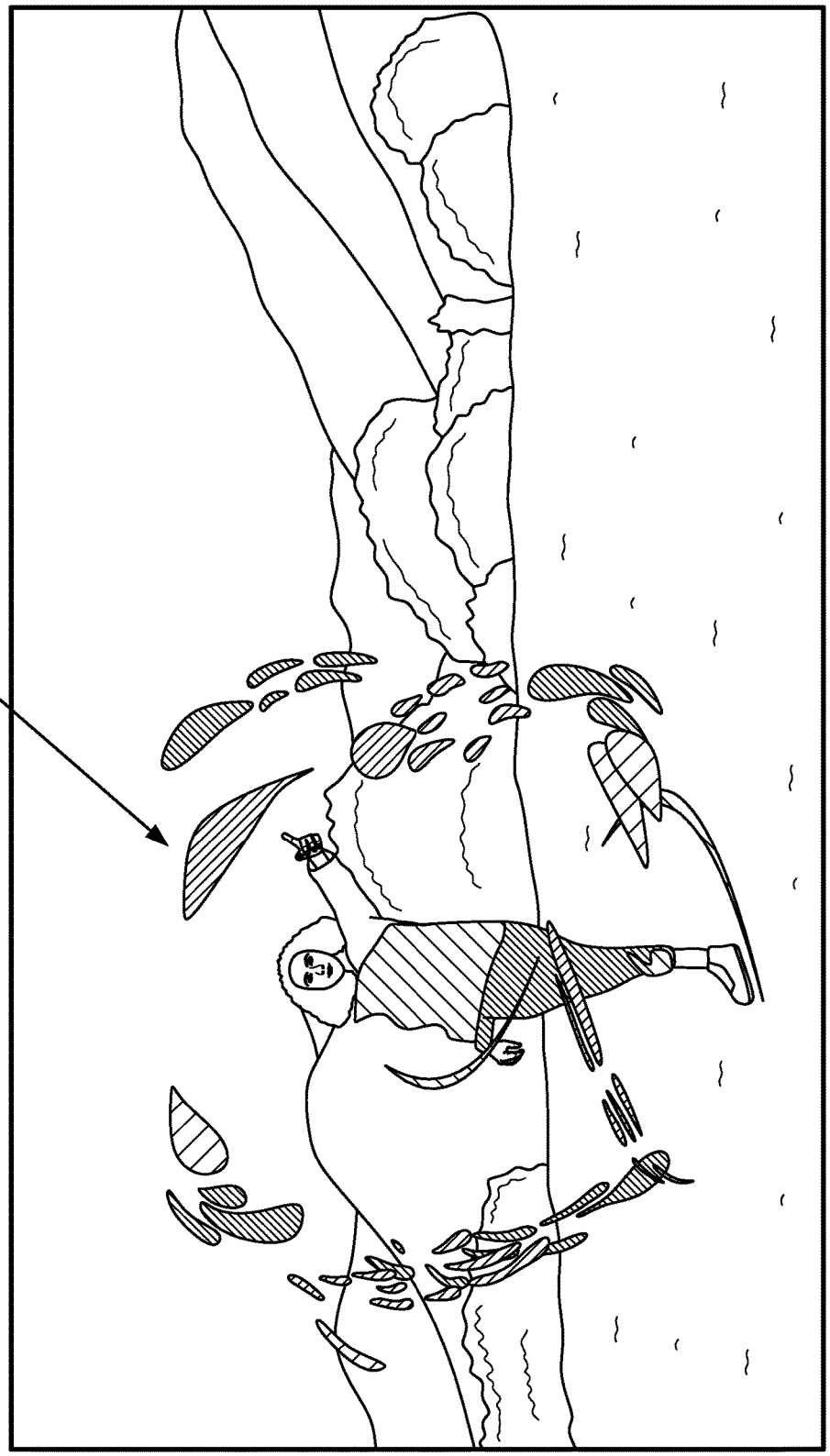
FIG. 18 illustrates an AR effect, in accordance with some examples.

FIG. 18 illustrates an AR effect 1800, in accordance with some examples. The selected AR effect 810 may be termed "paint strokes" as illustrated at 1802. The AR effect 810 is applied to the video 614 or frame by the editing module 818. The editing module 818 uses segmentation maps and/or 2D body tracking, in accordance with some examples. In some examples, the user selects an area, object, or person to apply the "paint strokes", which makes the area, object, or person of the video 614 or frame (image) to appear to have a painted portions of the video 614 or frame with "paint strokes" 1802 of different colors. The editing module 818 uses the flight plan 814 to assist in locating or tracking an area to apply the "flame", in accordance with some examples. In some examples, the "paint strokes" 1802 are added based on a movement of a person (or animal) within the video 614 where the "paint strokes" 1802 represent past movements of the person or animal.

Figure 19:
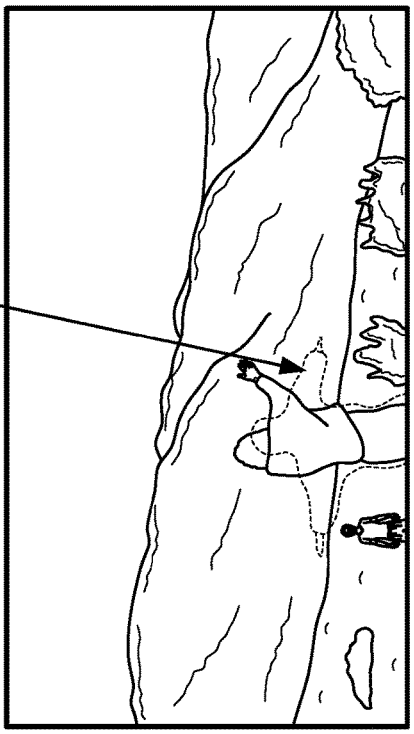
FIG. 19 illustrates an AR effect, in accordance with some examples.
Figure 19:
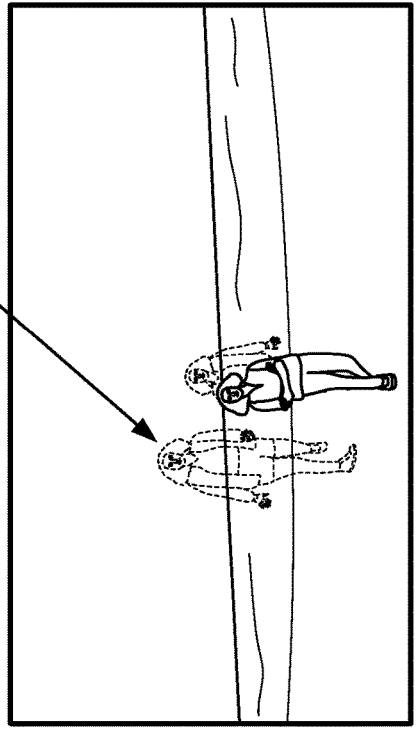
Figure 19:
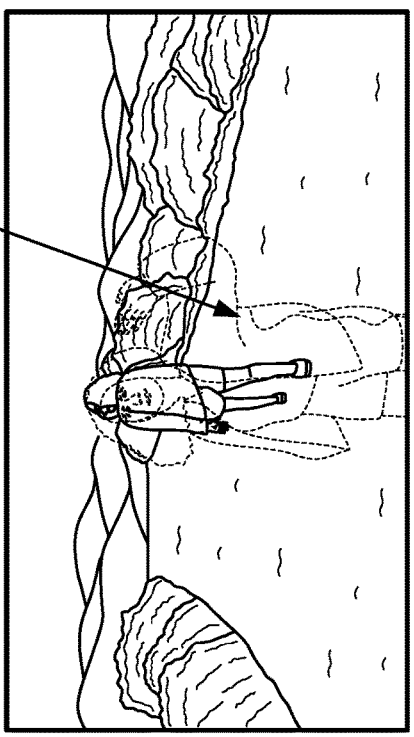
Figure 19:
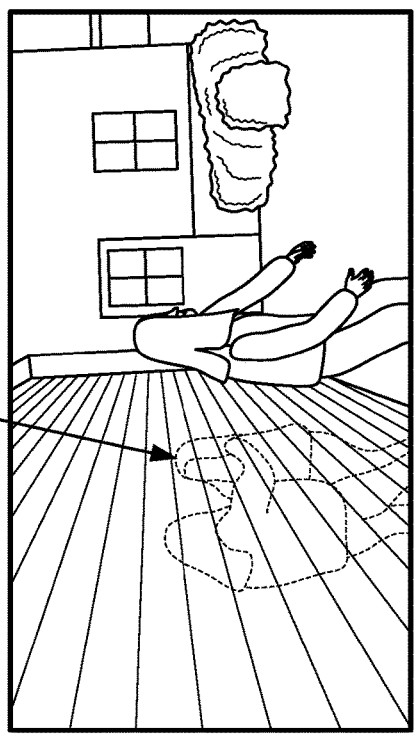

FIG. 19 illustrates an AR effect 1900, in accordance with some examples. The selected AR effect 810 may be termed "trippy" as illustrated at 1902. The AR effect 810 is applied to the video 614 or frame by the editing module 818. The editing module 818 uses segmentation maps and/or 2D body tracking, in accordance with some examples. In some examples, the user selects an area, object, or person to apply the "trippy", which turns the area, object, or person of the video 614 or the frame (image) to have multiple images of the area, object, or person or portions of the area, object, or person are duplicated near or on the original area, object, or person, which may include resizing and modifying the orientation. The "trippy" 1902 may uses different colors for the duplication of the area, object, or person (or portion thereof). The user may select an area, object, or person in the image or the entire image for the "trippy" 1902 to be applied. The editing module 818 uses the flight plan 814 to assist in locating or tracking an area, object, or person to apply the "trippy", in accordance with some examples. The editing module 818 adds three-dimensional duplicates, in accordance with examples.

Figure 20:
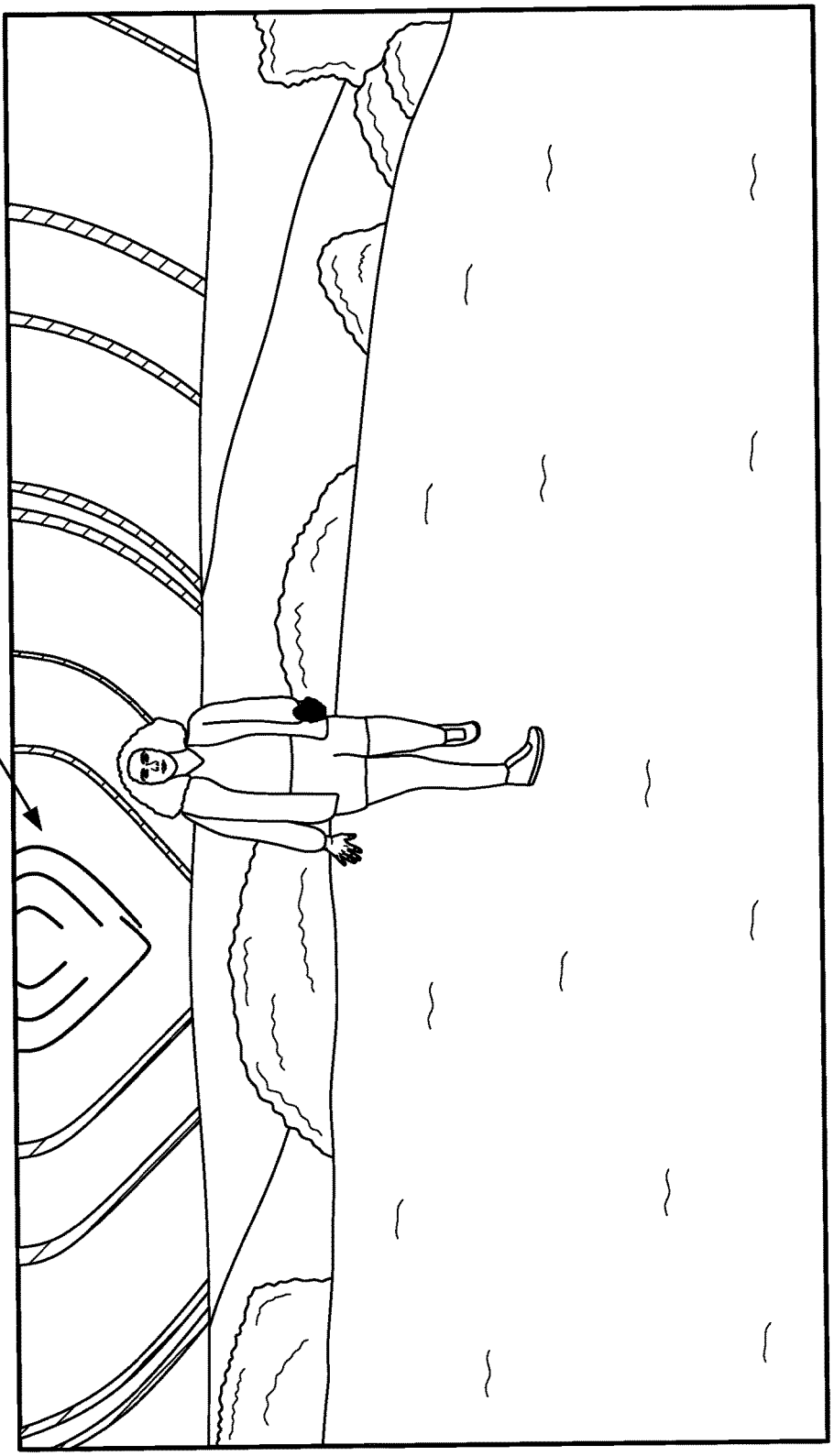
FIG. 20 illustrates an AR effect, in accordance with some examples.

FIG. 20 illustrates an AR effect 2000, in accordance with some examples. The selected AR effect 810 may be termed "hearts in sky" as illustrated at 2202. The AR effect 810 is applied to the video 614 or frame by the editing module 818. The editing module 818 uses segmentation maps to locate the sky, in accordance with some examples. The editing module 818 applies the "hearts in the sky" and keeps a central heart in a fixed location of the sky as the portion of the sky changes, in accordance with some examples. The "hearts in sky" 2202 uses different colors other than red, in accordance with some examples. The editing module 818 uses the flight plan 814 to assist in locating or tracking the sky (or a fixed location in the sky) to apply the "hearts in sky", in accordance with some examples. The editing module 818 adds three-dimensional hearts, in accordance with examples.

Figure 21:
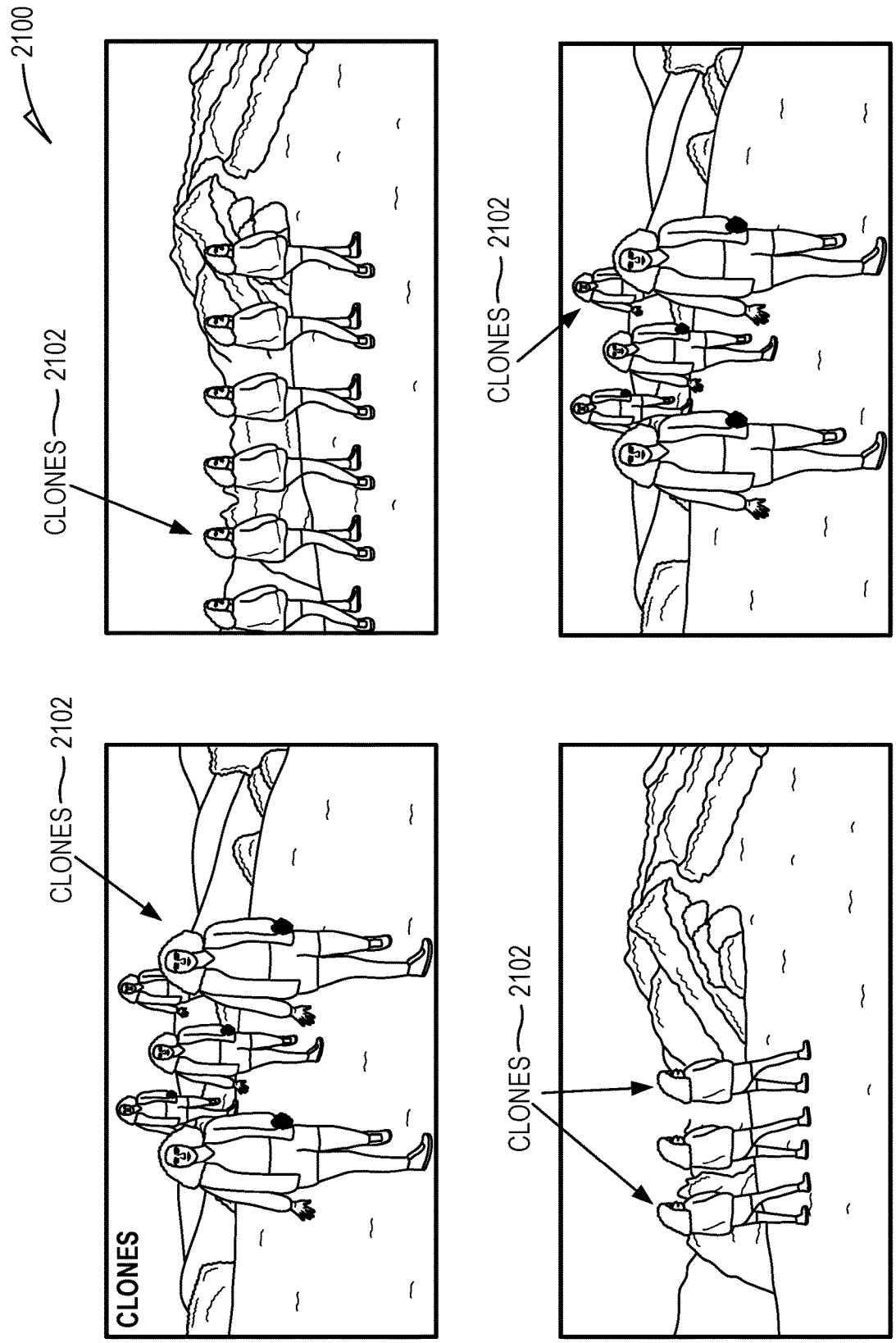
FIG. 21 illustrates an AR effect, in accordance with some examples.

FIG. 21 illustrates an AR effect 2100, in accordance with some examples. The AR effect 810 may be termed "clones" as illustrated at 2102. The AR effect 810 is applied to the video 614 or frame by the editing module 818. The editing module 818 uses segmentation maps and/or 2D body tracking, in accordance with some examples. In some examples, the user selects an area, object, or person to apply the "clones", which clones the area, object, or person of the video 614 or the frame (image) and places the "clones" in a pattern. The clones may be resized and/or the orientation changed. The clones may be positioned in accordance with movements of the person or animal within the video 614. The pattern may include placing many clones in a position coming toward a camera capturing the images. The patterns may include formations such as clones along a line where the line may be part of the geography of the area. The pattern may be a formation such as four clones added for a formation of five. The "clones" 2002 may uses different colors for the clones. The editing module 818 uses the flight plan 814 to assist in locating or tracking an area, object, or person to apply the "clones", in accordance with some examples. For example, the pattern may be a 360-degree pattern of placing the clones around a circle if the flight plan 814 performs a circle around a person or animal. The editing module 818 adds three-dimensional clones, in accordance with examples.

Figure 22:
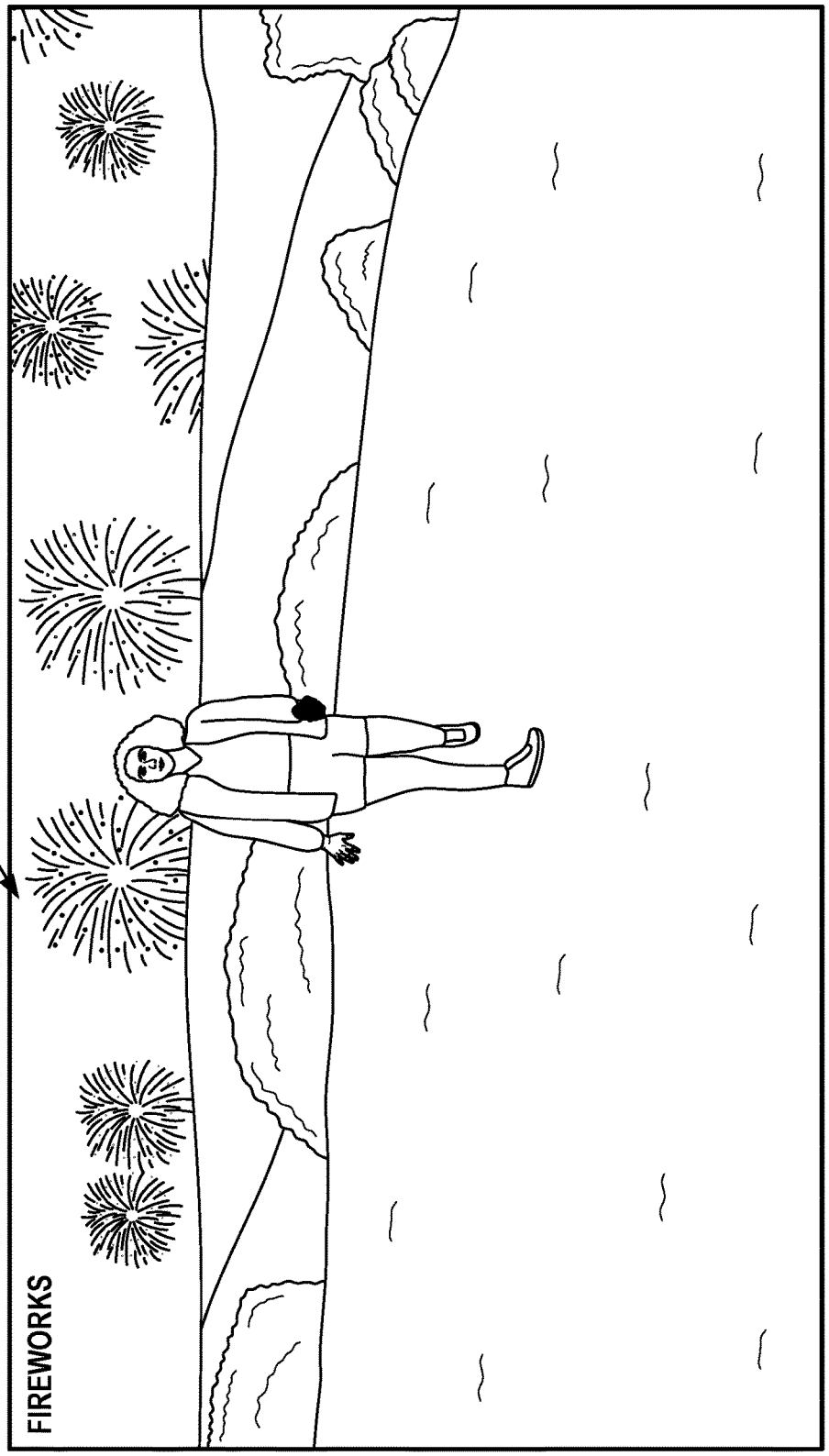
FIG. 22 illustrates an AR effect, in accordance with some examples.

FIG. 22 illustrates an AR effect 2200, in accordance with some examples. The AR effect 810 may be termed "fireworks" as illustrated at 2202. The AR effect 810 is applied to the video 614 or frame by the editing module 818. The editing module 818 uses segmentation maps and/or 2D body tracking, in accordance with some examples. In some examples, the editing module 818 identifies a sky and places the "fireworks" 2202 in the sky to make it appear as if real fireworks were going off in the video 614 or image. The "fireworks" 2202 are displayed in a pattern. In some examples, the fireworks 2202 are updated for an entire video 614 to give the impression that real "fireworks" 2202 were being displayed during the video. Sounds may be added to the video 614 in concert with the "fireworks" 2202.

The editing module 818 uses the flight plan 814 to assist in locating or tracking the sky, in accordance with some examples. The editing module 818 adds AR three-dimensional fireworks, in accordance with examples.

Figure 23:
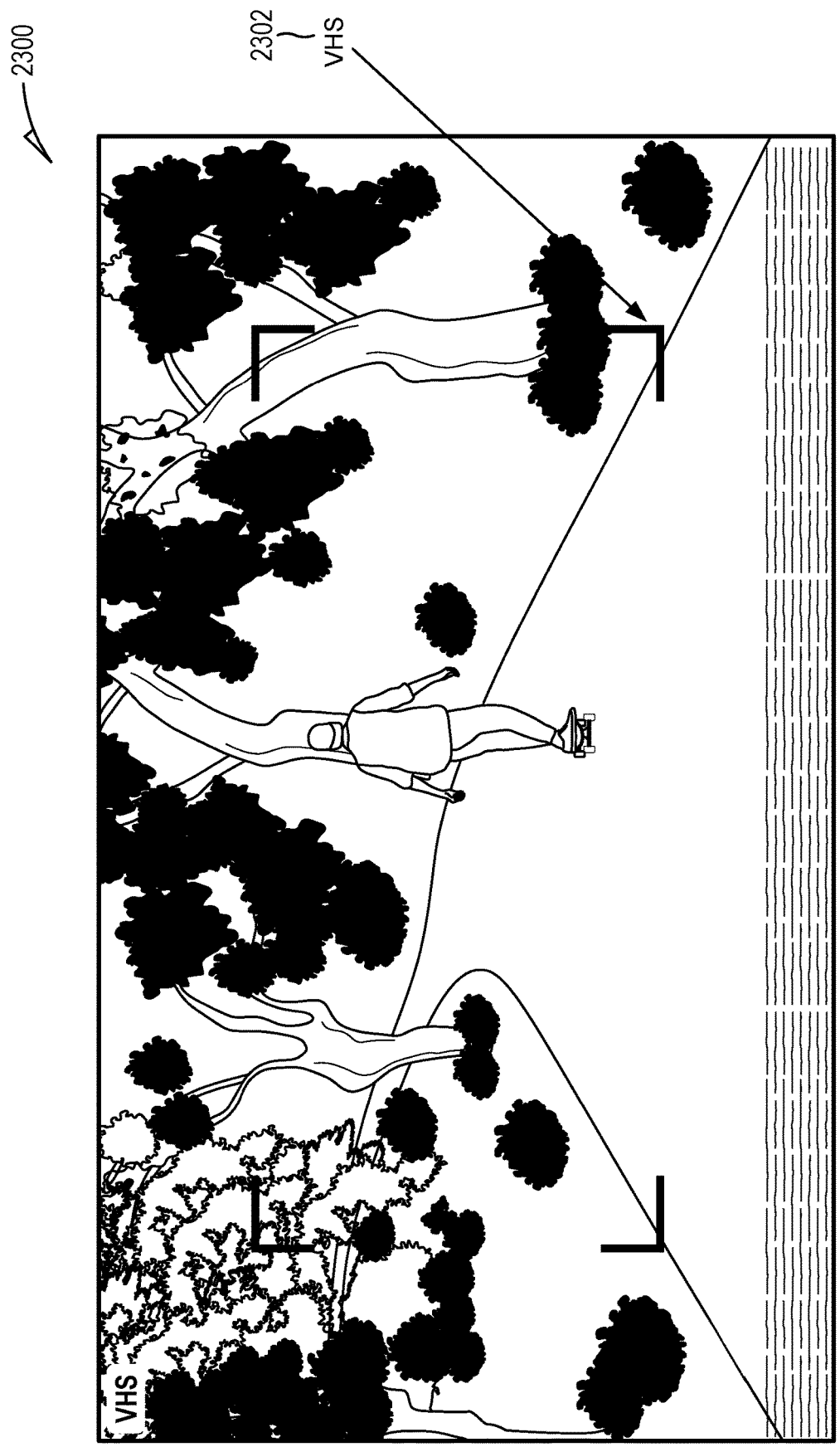
FIG. 23 illustrates an AR effect, in accordance with some examples.

FIG. 23 illustrates an AR effect 2300, in accordance with some examples. The AR effect 810 may be termed "VHS" as illustrated at 2302. The AR effect 810 is applied to the video 614 or frame by the editing module 818. The editing module 818 uses segmentation maps and/or 2D body tracking, in accordance with some examples. In some examples, the editing module 818 identifies places the brackets in the video 614 or frame to make it appear that the video 614 or frame was an old VHS 2302 video 614 or frame. In some examples, the editing module 818 down samples the video 614 or frame to make it appear the quality is lower in accordance with some old VHS formats. In some examples, the editing module 818 adds other effects. The other effects include adding scratchy or out of tune wavy lines in the video 614 such as on the bottom, adding scratchy lines in the video 614 or frame to make it appear the tape of a VHS was scratched, and so forth.

The editing module 818 uses the flight plan 814 to assist in adding the "VHS" 2302, in accordance with some examples. The editing module 818 adds AR three-dimensional "VHS" 2302, in accordance with examples.

Figure 24:
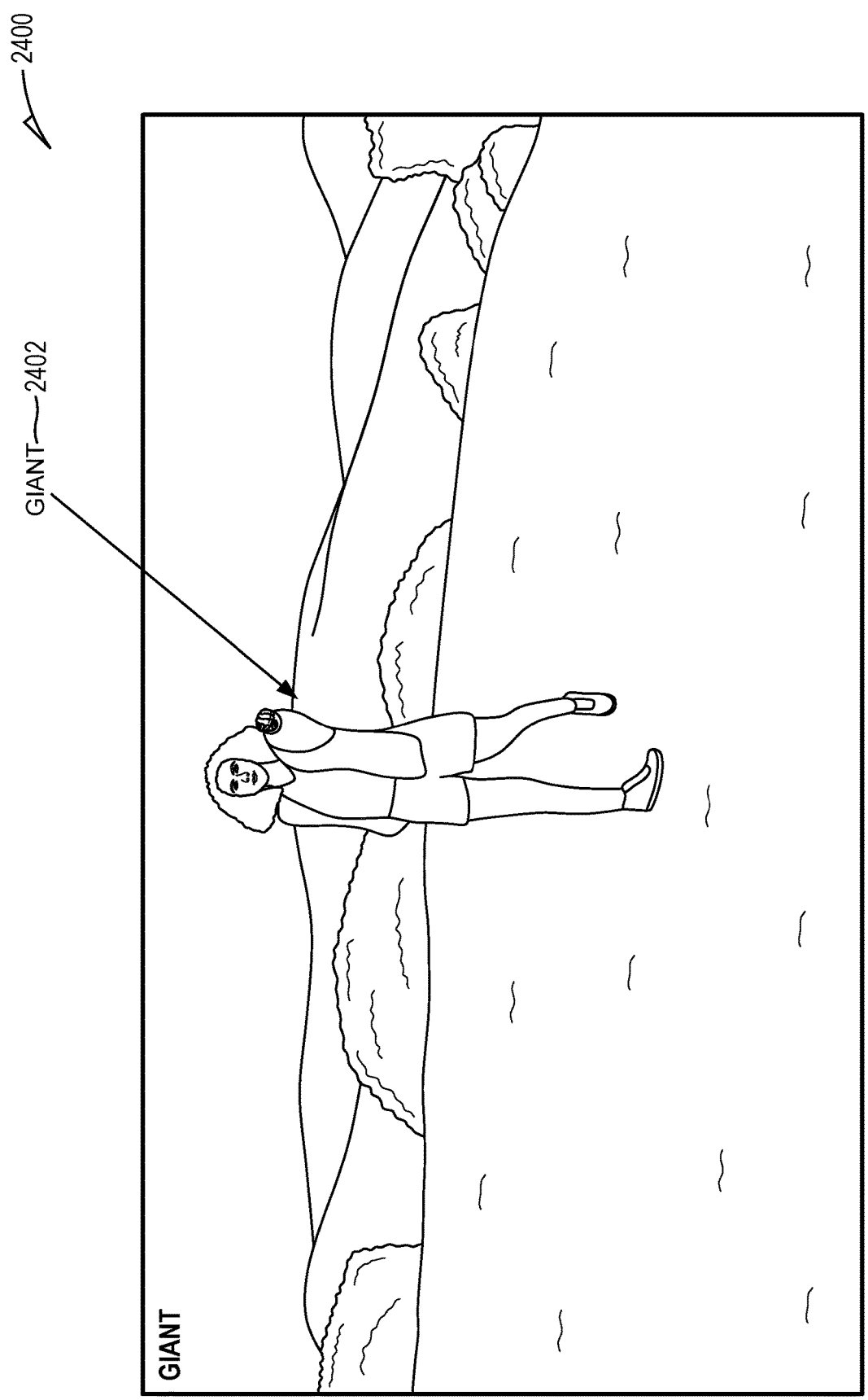
FIG. 24 illustrates an AR effect, in accordance with some examples.

FIG. 24 illustrates an AR effect 2400, in accordance with some examples. The AR effect 810 may be termed "giant" as illustrated at 2402. The AR effect 810 is applied to the video 614 or frame by the editing module 818. The editing module 818 uses segmentation maps and/or 2D body tracking, in accordance with some examples. In some examples, the editing module 818 identifies an object or person (or animal) in the video 614 or frame to make to the object or person (or animal) into a giant 2402. In some examples, the editing module 818 adjusts the shading to make the giant appear realistic. In some examples, the editing module 818 adds other effects. The editing module 818 uses the flight plan 814 to assist in adding the "giant" 2402, in accordance with some examples. The editing module 818 adds AR three-dimensional "giant" 2402, in accordance with examples.

Figure 25:
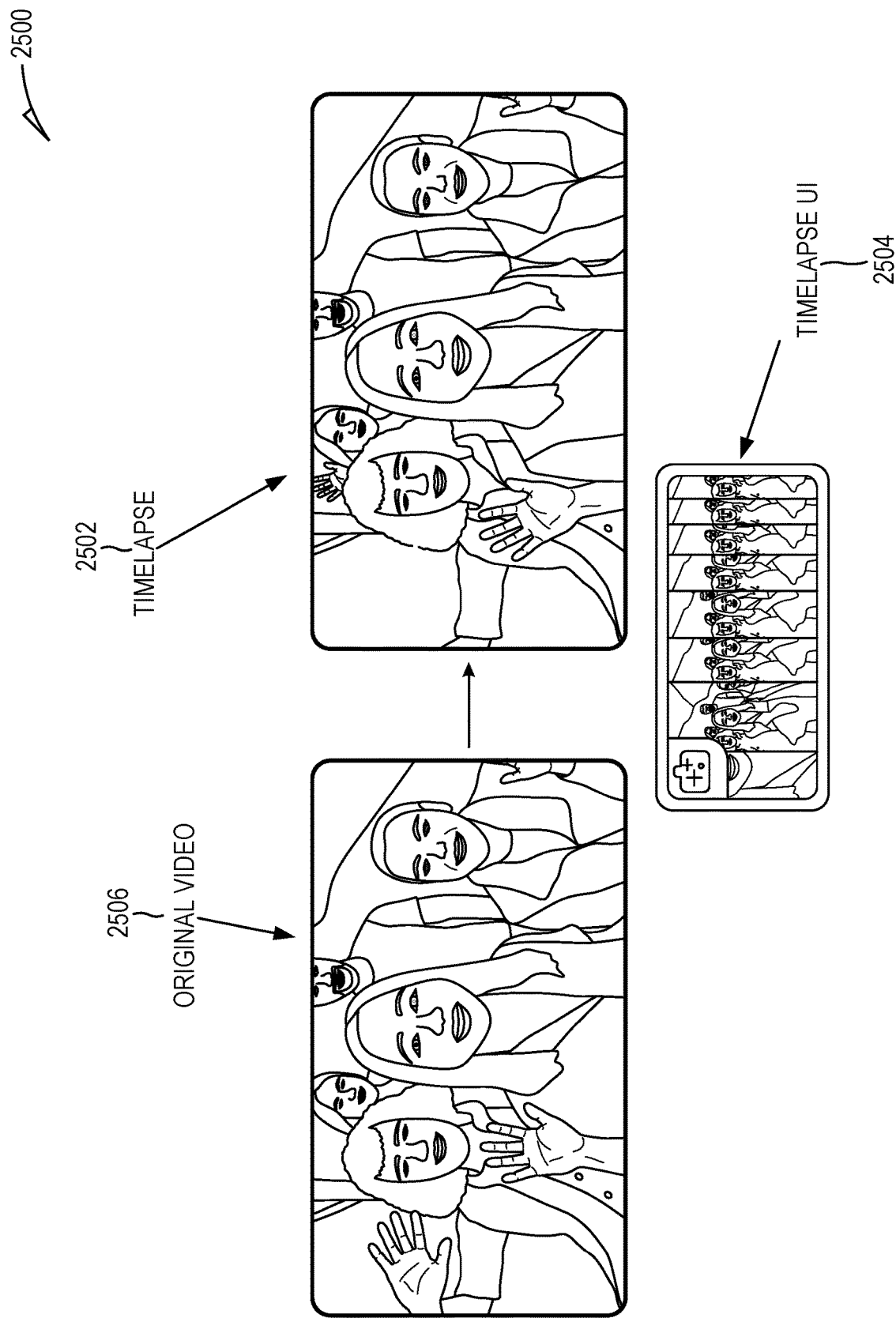
FIG. 25 illustrates video editing effects, in accordance with some examples.

FIG. 25 illustrates video editing effects 2500, in accordance with some examples. The video editing effect 812 may be termed "time lapse" as illustrated at 2502. In "time lapse" frames of the original video 2506 are edited so that a slower action (such as the opening of a flower bud) appears to be speeded up. The editing module 818 in applying "time lapse" may select some frames such as a frame out of every 10 frames or another number for the edited video 614.

The timelapse UI 2504 is a custom UI 816 that is customized for the "time lapse", in accordance with some examples. The timelapse UI 2504 enables a quick selection of a frame of the edited video 614. The editing module 818 uses the flight plan 814 to assist in adding the "time lapse" 2502, in accordance with some examples. For example, the editing module 818 changes the number of frames that are selected from the video 614 in accordance with an associated position of the frame of the video 614 in relation to the flight plan 814. As an example, a flight plan 814 around a person may have fewer frames selected to make the flight appear quicker than an initial start or stop period of the flight plan 814.

Figure 26:
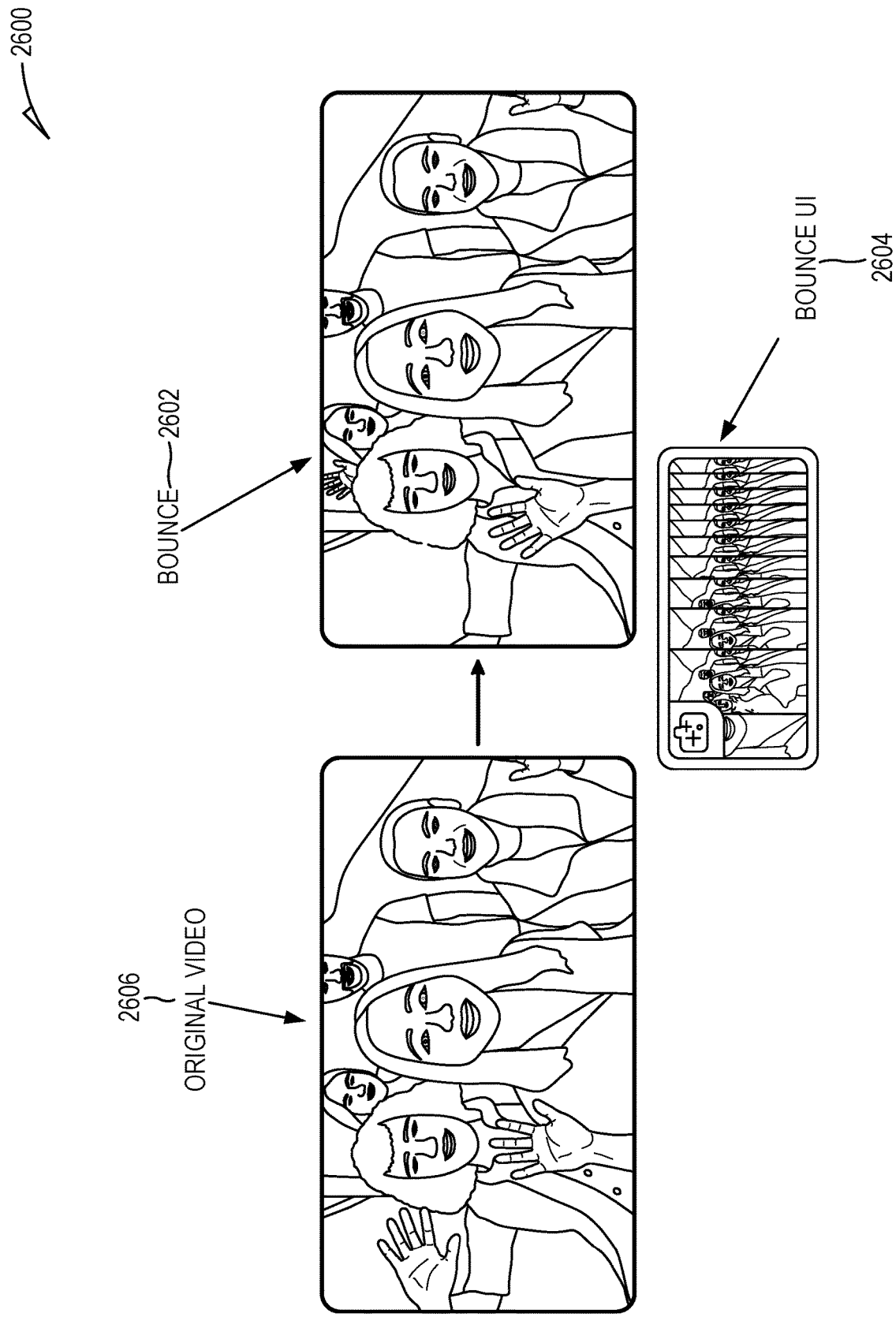
FIG. 26 illustrates video editing effects, in accordance with some examples.

FIG. 26 illustrates video editing effects 2600, in accordance with some examples. The video editing effect 812 may be termed "bounce" as illustrated at 2602. In "bounce" frames of the video are edited so that an object or person (or animal) appears to bounce around the video 614. In some examples, the video 614 appears to be taken from one perspective such as the camera appears not to be moving or to only be moving slightly such as a drone 610 hovering. The object or person appears to bounce around the video. The editing module 818 may perform the "bounce" video editing effects 812 by selecting frames from an original video 2606. The frames may be selected based on an image quality of the frames and a location of an object or person within the frame. The editing module 818 selects frames to make it appear an object or person moves along a motion path in a choppy or bouncy way. The editing module 818 uses the flight plan 814 to assist in adding the "bounce" 2602, in accordance with some examples. For example, the editing module 818 changes the number of frames that are selected from the video 614 in accordance with an associated position of the frame of the video 614 in relation to the flight plan 814. The bounce UI 2604 is a custom UI 816 that is customized for the "bounce" video editing effect 812, in accordance with some examples. The bounce UI 2604 enables easy select of frames of the bounce 2602 video.

Figure 27:
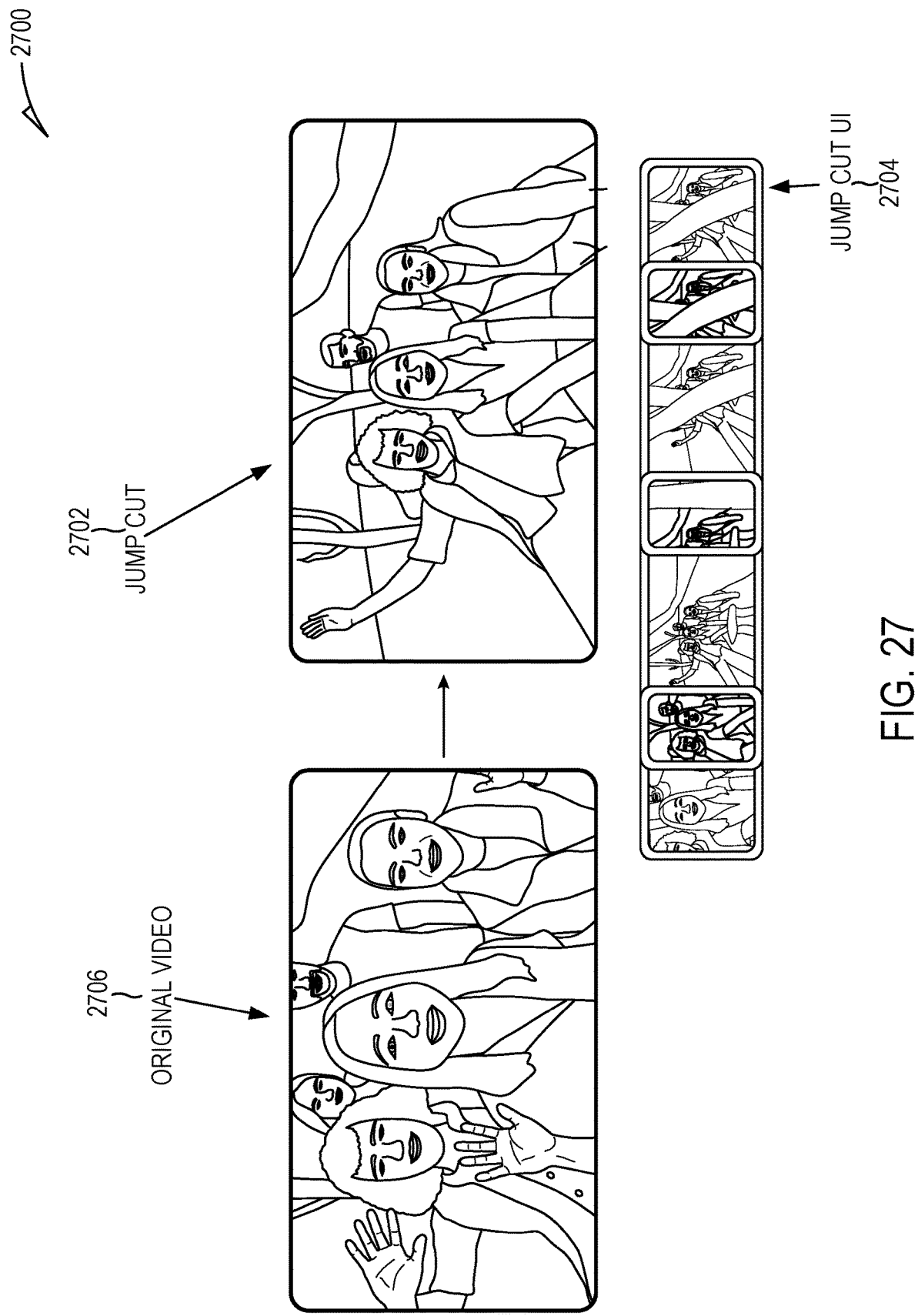
FIG. 27 illustrates video editing effects, in accordance with some examples.

FIG. 27 illustrates video editing effects 2700, in accordance with some examples. The video editing effect 812 may be termed "jump cut" as illustrated at 2702. In "jump cut" frames of the video are edited so that an object or person (or animal) appears to jump from one place in the video 614 to another. In some examples, the video 614 appears to be taken from one perspective such as the camera appears not to be moving or to only be moving slightly such as a drone 610 hovering. The object or person appears to jump forward, backward, or another direction in the edited video 614. The editing module 818 may perform the "jump cut" video editing effects 812 by selecting frames from the original video 2706. The frames may be selected based on an image quality of the frames and a location of an object or person within the frame. The editing module 818 selects frames to make it appear an object or person jumps along a motion path in a jumpy way. The editing module 818 uses the flight plan 814 to assist in adding the "jump cut" 2702, in accordance with some examples. For example, the editing module 818 changes the number of frames that are selected from the video 614 in accordance with an associated position of the frame of the video 614 in relation to the flight plan 814. The jump cut UI 2704 is a custom UI 816 that is customized for the "jump cut" video editing effect 812, in accordance with some examples.

Figure 28:
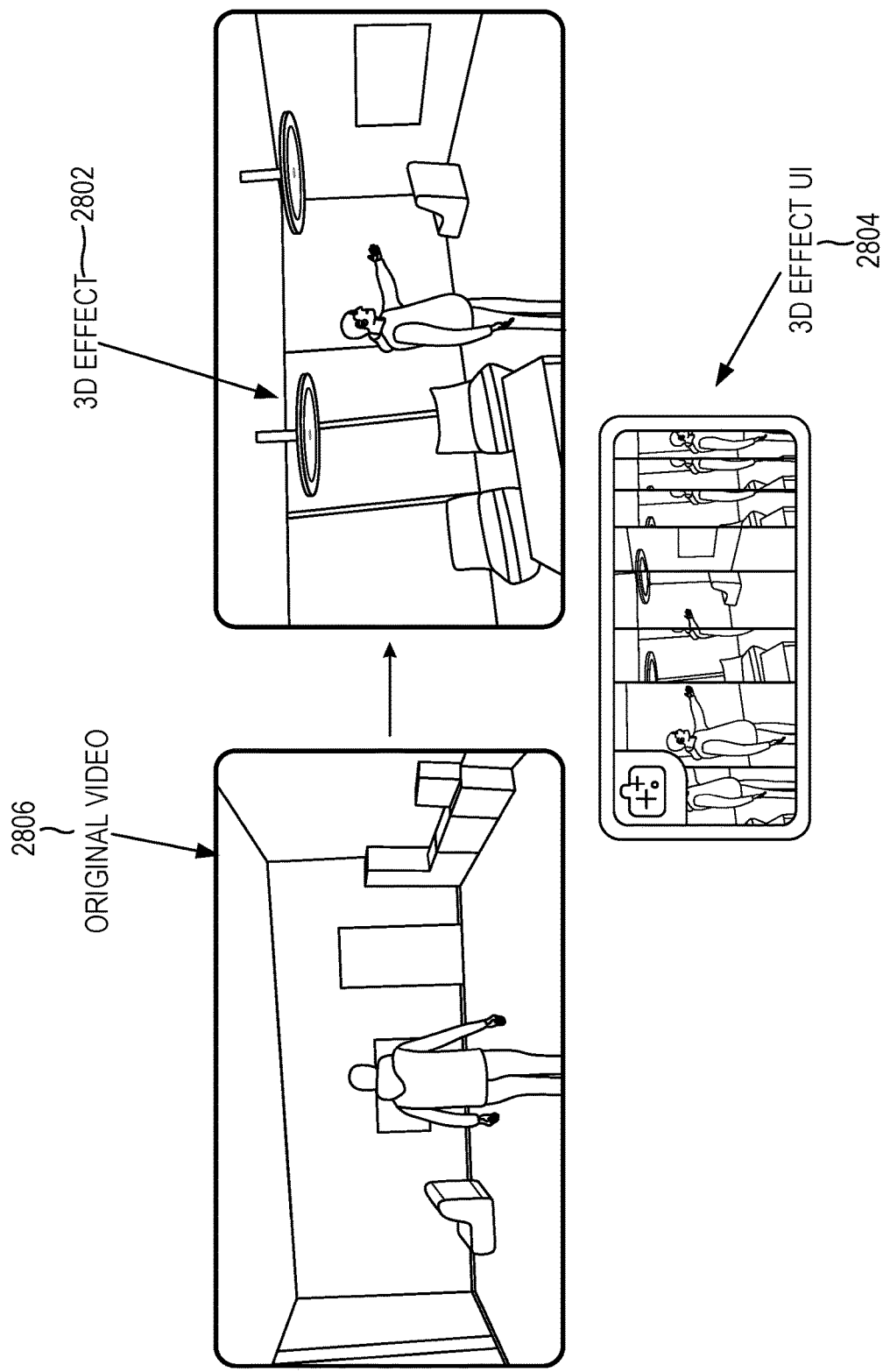
FIG. 28 illustrates video editing effects, in accordance with some examples.

FIG. 28 illustrates video editing effects 2800, in accordance with some examples. The video editing effect 812 may be termed "3D Effect" as illustrated at 2802. In "3D effect", editing module 818 edits frames of the video to add 3D effects, which may be added in a symmetric manner in accordance with an object or person (or animal) in the original video 2806. The 3D effect may be AR 3D effects that are animated and symmetrically placed around an object, person, or animal.

The editing module 818 uses the flight plan 814 to assist in adding the "3D effects" 2802, in accordance with some examples. For example, the editing module 818 determines symmetry based on a circular orbit around a person and places 3D effects symmetrical around the person. In another example, when the flight plan 814 is a 360-degree flight path above a person, the editing module 818 processes the edited video by adding three dimensional effects to the video symmetrically around the 360-degree flight path. The 3D effect UI 2804 is a custom UI 816 that is customized for the "3D effect" video editing effect 812, in accordance with some examples. The UI 2804 provides a timeline representation of the edited video 614.

Figure 29:
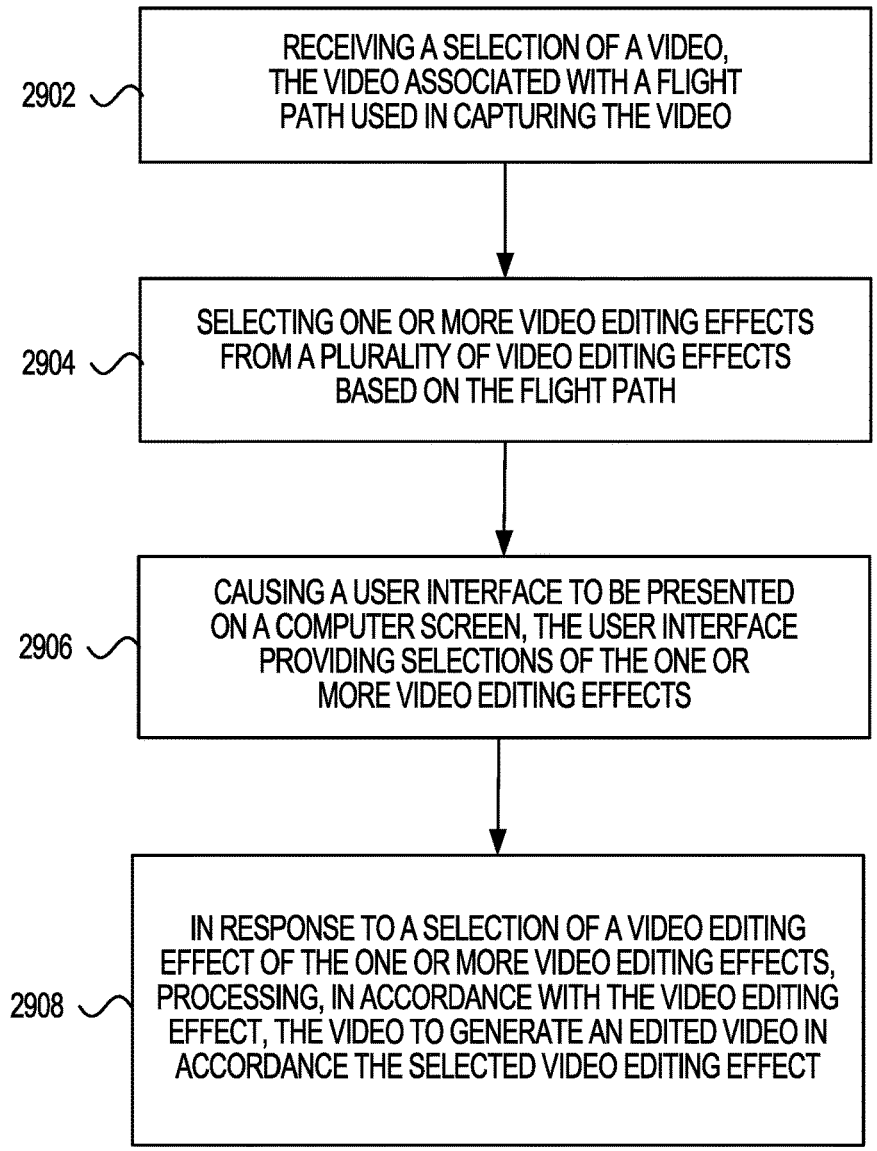
FIG. 29 illustrates a method for editing video captured by an electronic device, in accordance with some examples.

FIG. 29 illustrates a method 2900 for editing video captured by an electronic device, in accordance with some examples. The method 2900 begins at operation 2902 with receiving a selection of a video, the video associated with a flight path used in capturing the video. For example, referring to FIG. 8, the video editor 808 receives or accesses a video 614 that is associated with a flight plan 616. The method 2900 continues at operation 2904 with selecting one or more video editing effects from a plurality of video editing effects based on the flight path. For example, the editing module 818 selects video editing effects 812 that are appropriate based on the flight plan 616 matching the flight plan 814.

The method 2900 continues at operation 2906 with causing a user interface to be presented on a computer screen, the user interface providing selections of the one or more video editing effects. For example, referring to FIG. 9, the editing module 818 presents video editing effects 908 on the screen 804 of the smartphone 608.

The method 2900 continues at operation 2908 with in response to a selection of a video editing effect of the one or more video editing effects, processing, in accordance with the video editing effect, the video to generate an edited video in accordance the selected video editing effect. For example, the editing module 818 processes the video 614 to generate an edited video in accordance with the selected video editing effect of the video editing effects 908.

The method 2900 may be performed by one or more devices or apparatuses of devices discussed herein either alone or in conjunction with one another. For example, the messaging system 100, smartphone 608, another device, or an apparatus of the device, may perform the method 2900 either alone or in conjunction with one another. One or more of the operations of method 2900 may be optional. Method 2900 may include one or more additional operations. One or more operations of method 2900 may be performed in a different order. Additionally, the messaging system 100 and smartphone 608 are configured to perform the functions and methods described in FIGS. 6-29 and herein.

Machine Architecture

Figure 30:
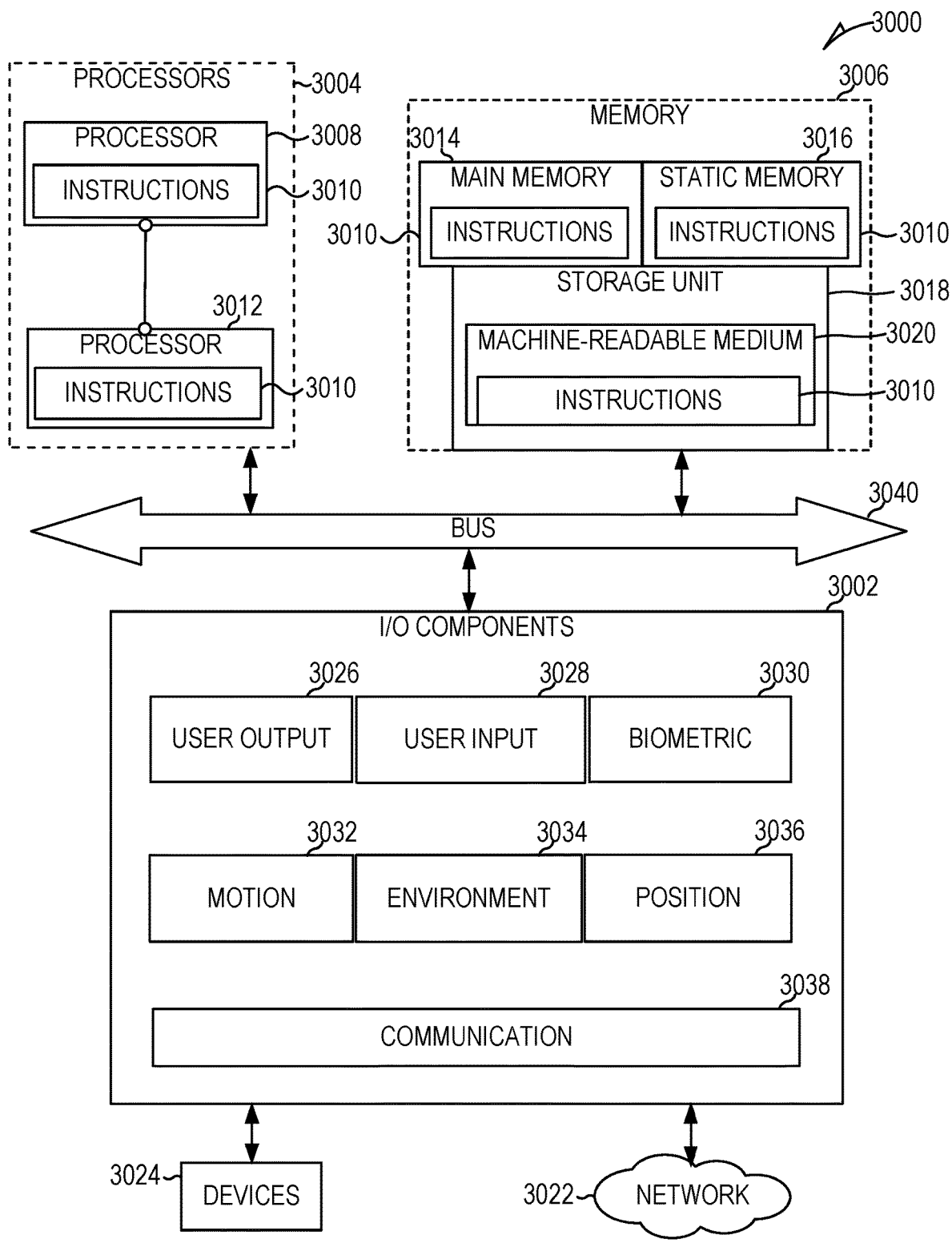
FIG. 30 is a diagrammatic representation of a machine in the form of a computer system within which a set of instructions may be executed for causing the machine to perform any one or more of the methodologies discussed herein, in accordance with some examples.

FIG. 30 is a diagrammatic representation of the machine 3000 within which instructions 3010 (e.g., software, a program, an application, an applet, an app, or other executable code) for causing the machine 3000 to perform any one or more of the methodologies discussed herein may be executed. For example, the instructions 3010 may cause the machine 3000 to execute any one or more of the methods described herein. The instructions 3010 transform the general, non-programmed machine 3000 into a particular machine 3000 programmed to carry out the described and illustrated functions in the manner described. The machine 3000 may operate as a standalone device or may be coupled (e.g., networked) to other machines. In a networked deployment, the machine 3000 may operate in the capacity of a server machine or a client machine in a server-client network environment, or as a peer machine in a peer-to-peer (or distributed) network environment. The machine 3000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 3010, sequentially or otherwise, that specify actions to be taken by the machine 3000. Further, while only a single machine 3000 is illustrated, the term "machine" shall also be taken to include a collection of machines that individually or jointly execute the instructions 3010 to perform any one or more of the methodologies discussed herein. The machine 3000, for example, may comprise the client device 102 or any one of a number of server devices forming part of the messaging server system 108. In some examples, the machine 3000 may also comprise both client and server systems, with certain operations of a particular method or algorithm being performed on the server-side and with certain operations of the particular method or algorithm being performed on the client-side.

The machine 3000 may include processors 3004, memory 3006, and input/output I/O components 3002, which may be configured to communicate with each other via a bus 3040. In an example, the processors 3004 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 3008 and a processor 3012 that execute the instructions 3010. The term "processor" is intended to include multi-core processors that may comprise two or more independent processors (sometimes referred to as "cores") that may execute instructions contemporaneously. Although FIG. 30 shows multiple processors 3004, the machine 3000 may include a single processor with a single-core, a single processor with multiple cores (e.g., a multi-core processor), multiple processors with a single core, multiple processors with multiples cores, or any combination thereof.

The memory 3006 includes a main memory 3014, a static memory 3016, and a storage unit 3018, both accessible to the processors 3004 via the bus 3040. The main memory 3006, the static memory 3016, and storage unit 3018 store the instructions 3010 embodying any one or more of the methodologies or functions described herein. The instructions 3010 may also reside, completely or partially, within the main memory 3014, within the static memory 3016, within machine-readable medium 3020 within the storage unit 3018, within at least one of the processors 3004 (e.g., within the Processor's cache memory), or any suitable combination thereof, during execution thereof by the machine 3000.

The I/O components 3002 may include a wide variety of components to receive input, provide output, produce output, transmit information, exchange information, capture measurements, and so on. The specific I/O components 3002 that are included in a particular machine will depend on the type of machine. For example, portable machines such as mobile phones may include a touch input device or other such input mechanisms, while a headless server machine will likely not include such a touch input device. It will be appreciated that the I/O components 3002 may include many other components that are not shown in FIG. 30. In various examples, the I/O components 3002 may include user output components 3026 and user input components 3028. The user output components 3026 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 3028 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 3002 may include biometric components 3030, motion components 3032, environmental components 3034, or position components 3036, among a wide array of other components. For example, the biometric components 3030 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 3032 include acceleration sensor components (e.g., accelerometer), gravitation sensor components, rotation sensor components (e.g., gyroscope).

The environmental components 3034 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 3036 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 3002 further include communication components 3038 operable to couple the machine 3000 to a network 3022 or devices 3024 via respective coupling or connections. For example, the communication components 3038 may include a network interface Component or another suitable device to interface with the network 3022. In further examples, the communication components 3038 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 3024 may be another machine or any of a wide variety of peripheral devices (e.g., a peripheral device coupled via a USB).

Moreover, the communication components 3038 may detect identifiers or include components operable to detect identifiers. For example, the communication components 3038 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 3038, such as location via Internet Protocol (IP) geolocation, location via Wi-Fi® signal triangulation, location via detecting an NFC beacon signal that may indicate a particular location, and so forth.

The various memories (e.g., main memory 3014, static memory 3016, and memory of the processors 3004) and storage unit 3018 may store one or more sets of instructions and data structures (e.g., software) embodying or used by any one or more of the methodologies or functions described herein. These instructions (e.g., the instructions 3010), when executed by processors 3004, cause various operations to implement the disclosed examples.

The instructions 3010 may be transmitted or received over the network 3022, using a transmission medium, via a network interface device (e.g., a network interface component included in the communication components 3038) and using any one of several well-known transfer protocols (e.g., hypertext transfer protocol (HTTP)). Similarly, the instructions 3010 may be transmitted or received using a transmission medium via a coupling (e.g., a peer-to-peer coupling) to the devices 3024.

Software Architecture

Figure 31:
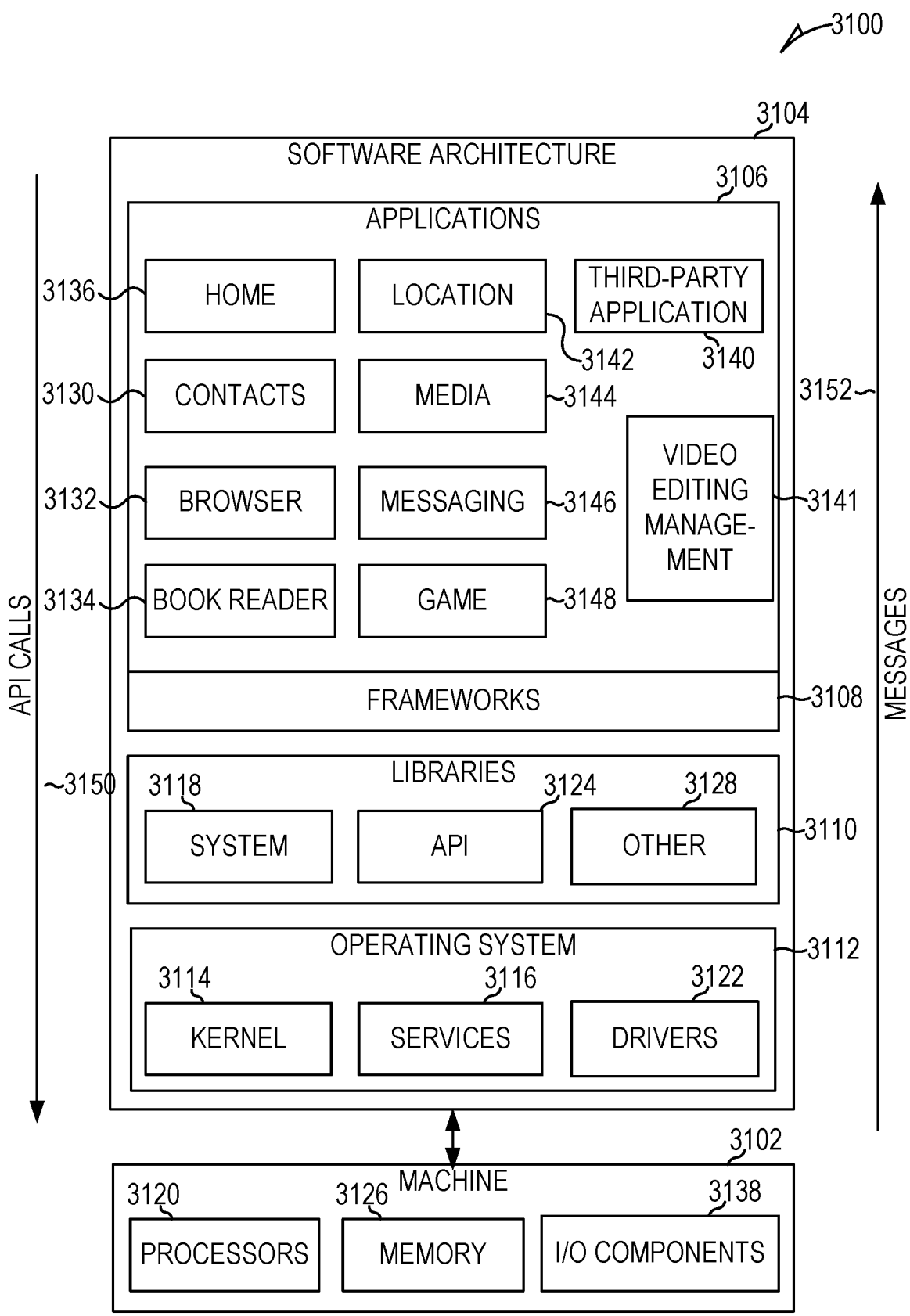
FIG. 31 is a block diagram showing a software architecture within which examples may be implemented.

FIG. 31 is a block diagram 3100 illustrating a software architecture 3104, which can be installed on any one or more of the devices described herein. The software architecture 3104 is supported by hardware such as a machine 3102 that includes processors 3120, memory 3126, and I/O components 3138. In this example, the software architecture 3104 can be conceptualized as a stack of layers, where each layer provides a particular functionality. The software architecture 3104 includes layers such as an operating system 3112, libraries 3110, frameworks 3108, and applications 3106. Operationally, the applications 3106 invoke API calls 3150 through the software stack and receive messages 3152 in response to the API calls 3150.

The operating system 3112 manages hardware resources and provides common services. The operating system 3112 includes, for example, a kernel 3114, services 3116, and drivers 3122. The kernel 3114 acts as an abstraction layer between the hardware and the other software layers. For example, the kernel 3114 provides memory management, processor management (e.g., scheduling), component management, networking, and security settings, among other functionalities. The services 3116 can provide other common services for the other software layers. The drivers 3122 are responsible for controlling or interfacing with the underlying hardware. For instance, the drivers 3122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 3110 provide a common low-level infrastructure used by the applications 3106. The libraries 3110 can include system libraries 3118 (e.g., C standard library) that provide functions such as memory allocation functions, string manipulation functions, mathematic functions, and the like. In addition, the libraries 3110 can include API libraries 3124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 3110 can also include a wide variety of other libraries 3128 to provide many other APIs to the applications 3106.

The frameworks 3108 provide a common high-level infrastructure that is used by the applications 3106. For example, the frameworks 3108 provide various graphical user interface (GUI) functions, high-level resource management, and high-level location services. The frameworks 3108 can provide a broad spectrum of other APIs that can be used by the applications 3106, some of which may be specific to a particular operating system or platform.

In an example, the applications 3106 may include a home application 3136, a contacts application 3130, a browser application 3132, a book reader application 3134, a location application 3142, a media application 3144, a messaging application 3146, a game application 3148, and a broad assortment of other applications such as a third-party application 3140. The video editing management 3141 system manages the video editing functions as disclosed in conjunction with the video editing management system 216 and herein. The applications 3106 are programs that execute functions defined in the programs. Various programming languages can be employed to create one or more of the applications 3106, structured in a variety of manners, such as object-oriented programming languages (e.g., Objective-C, Java, or C++) or procedural programming languages (e.g., C or assembly language). In a specific example, the third-party application 3140 (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application 3140 can invoke the API calls 3150 provided by the operating system 3112 to facilitate functionality described herein.

Processing Components

Figure 32:
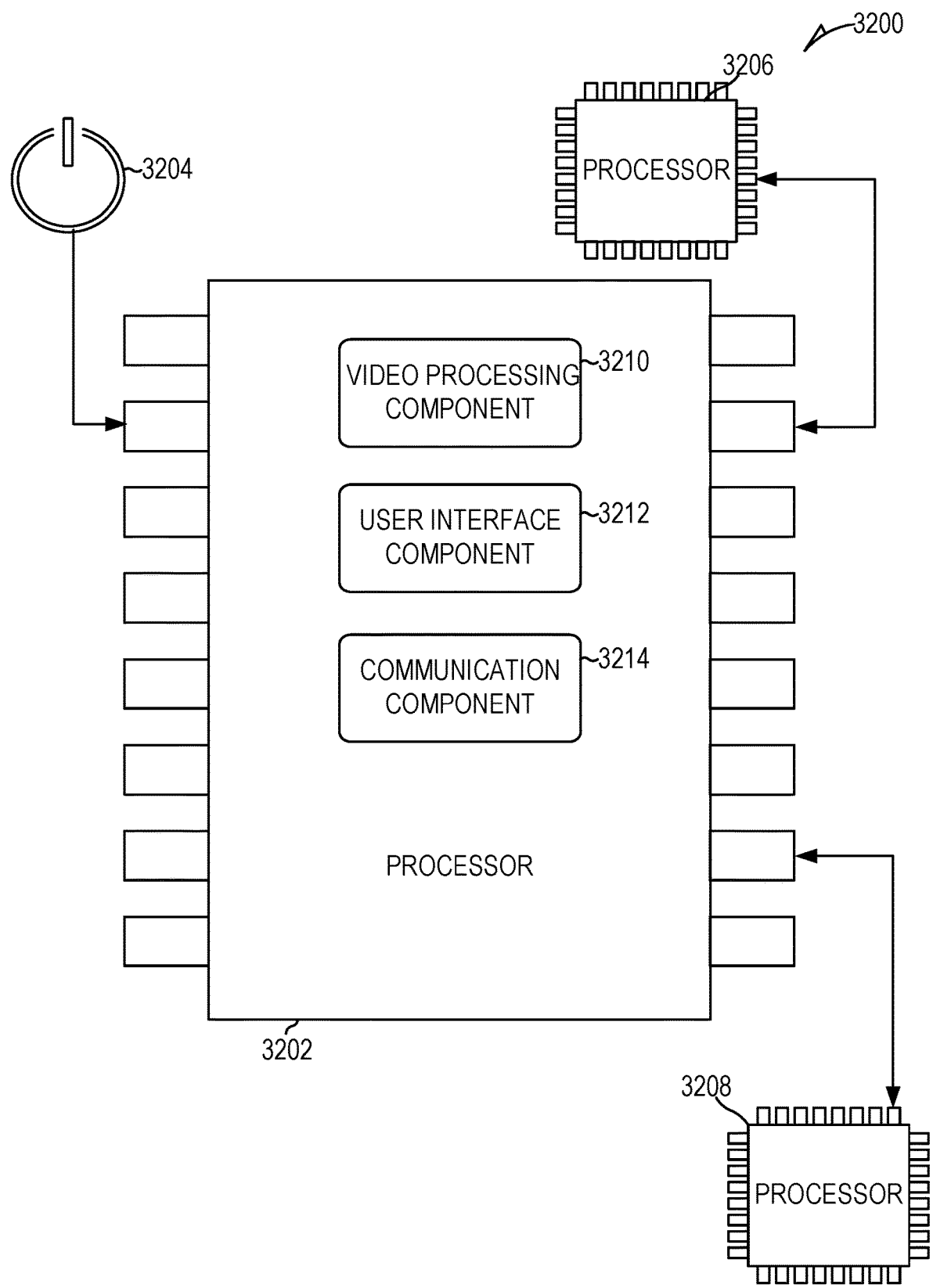
FIG. 32 is a diagrammatic representation of a processing environment, in accordance with some examples.

Turning now to FIG. 32 there is shown a diagrammatic representation of a processing environment 3200, which includes a processor 3202, a processor 3206, and a processor 3208 (e.g., a GPU, CPU or combination thereof).

The processor 3202 is shown to be coupled to a power source 3204, and to include (either permanently configured or temporarily instantiated) modules, namely a video processing component 3210, a user interface component 3212, and a communication component 3214. The video processing component 3210 controls processing of the videos 614 to apply video editing effects 812 and/or AR effects 810. The user interface component 3212 manages the interaction with a user such as presenting user interface items 821 and responding to the selection of user interface items 821 by a user. The communication component 3214 manages the communications such as communications 612, 613 from a smartphone 608 to other devices.

Glossary

Certain examples are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example examples, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A system comprising:
at least processor; and
a memory storing instructions that, when executed by the at least one processor, configure the processor to perform operations comprising:
receiving a selection of a video, the video associated with a flight path used in capturing the video;
selecting one or more video editing effects from a plurality of video editing effects based on the flight path;
causing a user interface to be presented on a computer screen, the user interface providing selections of the one or more video editing effects; and
in response to a selection of a video editing effect of the one or more video editing effects, processing, in accordance with the video editing effect, the video to generate an edited video in accordance the selected video editing effect, wherein the video editing effect applies different processing in accordance with an associated position within the flight path of a frame of a plurality of frames of the video.

2. The system of claim 1 wherein the user interface is a first user interface and wherein the operations further comprise:
selecting a second user interface based on the video editing effect; and
causing the second user interface to be presented on the computer screen.

3. The system of claim 2 wherein the processing further comprises:
generating the edited video by processing the video sequentially and repeatedly including first portions of the video in the edited video and skipping second portions of the video, wherein the video editing effect is a jump cut.

4. The system of claim 3 wherein the first portions are 1 second and the second portions are two seconds.

5. The system of claim 3 wherein the first user interface comprises a timeline representation of the video and the second user interface comprises a display of the first portions of video.

6. The system of claim 1 wherein the flight path is a 360-degree flight path above a person, and wherein the processing further comprises:
generating the edited video by selecting a fixed number of frames from the plurality of frame to represent the 360-degree flight path above the person.

7. The system of claim 6 wherein the selecting is based on a quality of the frame compared with neighboring frames.

8. The system of claim 1 wherein the flight path is a hover up and down flight path in front of a person, and wherein the processing further comprises:
generating the edited video by selecting a fixed number of frames from the plurality of frames of the hover up and down flight path.

9. The system of claim 1 wherein the flight path is a path away from or toward a person or object, and wherein the processing further comprises:
generating the edited video by selecting a fixed number of frames from the video along the path away from or toward the person or object.

10. The system of claim 1 wherein the processing further comprises:
generating the edited video by duplicating frames of the plurality of frames from the video along a path away from or toward a person or object.

11. The system of claim 1 wherein the flight path is a 360-degree flight path above a person, and wherein the processing further comprises:
generating the edited video by adding three dimensional effects to the video symmetrically around the 360-degree flight path.

12. The system of claim 1 wherein the user interface is a first user interface, the edited video is a first edited video, and wherein the operations further comprise:
presenting a second user interface for adding effects or augmented reality (AR) effects to the edited video; and
in response to a selection of an effect of the effects or a selection of an AR effect of the AR effects, processing, in accordance with the effect or AR effect, the video to generate a second edited video in accordance with the selected effect or the selected AR effect.

13. The system of claim 12 further comprising:
processing the video based on 2-dimensional body tracking and segmentation masks.

14. The system of claim 12 wherein the processing further comprises:
identifying a person in frames of the video; and
processing the person in the frames by mapping the person onto a crystal structure, wherein colors of the person are used by from the crystal structure and original colors.

15. The system of claim 12 wherein the processing further comprises:
identifying a person in frames of the video; and
processing the person in the frames of the plurality of frame by enlarging the person to a size of one and a half times a height of the person to five times the height of the person.

16. The system of claim 12 wherein the AR effects comprise one or more of: adding pixie dust, adding a flame around a person, turning a person into shattered crystals, adding hearts around a person, adding paint strokes in accordance with an arm movement of a person, merging frames of the video together to add multiple copies of a person and changing colors of clothing of the person.

17. A method comprising:
receiving a selection of a video, the video associated with a flight path used in capturing the video;
selecting one or more video editing effects from a plurality of video editing effects based on the flight path;
causing a user interface to be presented on a computer screen, the user interface providing selections of the one or more video editing effects; and
in response to a selection of a video editing effect of the one or more video editing effects, processing, in accordance with the video editing effect, the video to generate an edited video in accordance the selected video editing effect, wherein the video editing effect applies different processing in accordance with an associated position within the flight path of a frame of a plurality of frames of the video.

18. The method of claim 17 wherein the user interface is a first user interface and wherein the method further comprise:
selecting a second user interface based on the video editing effect; and
causing the second user interface to be presented on the computer screen.

19. A non-transitory computer-readable storage medium, the non-transitory computer-readable storage medium including instructions that, when executed by at least one processor of an apparatus of a system, cause the at least one processor to perform operations comprising:

receiving a selection of a video, the video associated with a flight path used in capturing the video;

selecting one or more video editing effects from a plurality of video editing effects based on the flight path;

causing a user interface to be presented on a computer screen, the user interface providing selections of the one or more video editing effects; and in response to a selection of a video editing effect of the one or more video editing effects, processing, in accordance with the video editing effect, the video to generate an edited video in accordance the selected video editing effect, wherein the video editing effect applies different processing in accordance with an associated position within the flight path of a frame of a plurality of frames of the video.

20. The non-transitory computer-readable storage medium of claim 19, wherein the user interface is a first user interface and wherein the operations further comprise:

selecting a second user interface based on the video editing effect; and causing the second user interface to be presented on the computer screen.

\* \* \* \* \*